(12) United States Patent
Hoffman

(10) Patent No.: US 7,698,567 B2
(45) Date of Patent: Apr. 13, 2010

(54) SYSTEM AND METHOD FOR TOKENLESS BIOMETRIC ELECTRONIC SCRIP

(75) Inventor: Ned Hoffman, Sebastopol, CA (US)

(73) Assignee: YT Acquisition Corporation, Delray Beach, FL (US)

( * ) Notice: Subject to any disclaimer, the term of this patent is extended or adjusted under 35 U.S.C. 154(b) by 710 days.

(21) Appl. No.: 11/321,114

(22) Filed: Dec. 28, 2005

(65) Prior Publication Data

US 2006/0107069 A1    May 18, 2006

Related U.S. Application Data

(60) Division of application No. 10/734,851, filed on Dec. 11, 2003, now abandoned, which is a division of application No. 09/441,107, filed on Nov. 16, 1999, now abandoned, which is a continuation of application No. 09/244,784, filed on Feb. 5, 1999, now Pat. No. 6,012,039, which is a continuation-in-part of application No. 08/705,399, filed on Aug. 29, 1996, now Pat. No. 5,870,723, which is a continuation-in-part of application No. 08/442,895, filed on May 17, 1995, now Pat. No. 5,613,012, which is a continuation-in-part of application No. 08/345,523, filed on Nov. 28, 1994, now Pat. No. 5,615,277.

(51) Int. Cl.
    *G06F 21/00*      (2006.01)
    *G06Q 20/00*      (2006.01)

(52) U.S. Cl. .......................... 713/186; 705/16

(58) Field of Classification Search ........................ None
See application file for complete search history.

(56) References Cited

U.S. PATENT DOCUMENTS 3,639,905 A    2/1972    Yaida et al.

(Continued)

FOREIGN PATENT DOCUMENTS

EP      0581421 A1    2/1994

(Continued)

OTHER PUBLICATIONS

Virginia Department of social services, Home Page.*

(Continued)

*Primary Examiner*—F. Zeender
*Assistant Examiner*—Mussa Shaawat
(74) *Attorney, Agent, or Firm*—Marger Johnson & McCollom, P.C.

(57) ABSTRACT

The present invention satisfies these needs by providing an improved system and method for tokenless authorization of an electronic scrip transaction using at least one scrip supporter biometric sample and an electronic identicator. The preferred embodiment of the method comprises the steps of a scrip supporter registration step, wherein a scrip supporter registers with an electronic identicator at least one registration biometric sample, an electronic scrip transaction proposal step, comprising electronic scrip donator account data, at least one transmittal step, wherein a scrip supporter bid biometric sample is obtained from the scrip supporter's person and is electronically transmitted to the electronic identicator, a scrip supporter identification step, wherein the electronic identicator compares the bid biometric sample with at least one registration biometric sample for producing either a successful or failed identification of the scrip supporter, wherein upon successful identification of the scrip supporter, a scrip transaction is biometrically authorized, without the scrip supporter presenting any personalized man-made tokens such as smartcards or magnetic swipe cards.

15 Claims, 5 Drawing Sheets

U.S. PATENT DOCUMENTS

| | | |
|---|---|---|
| 3,975,711 A | 8/1974 | McMahon |
| 3,876,864 A | 4/1975 | Clark et al. |
| 3,943,335 A | 3/1976 | Kinker et al. |
| 4,048,618 A | 9/1977 | Hendry |
| 4,151,512 A | 4/1979 | Riganati et al. |
| 4,208,651 A | 6/1980 | McMahon |
| 4,213,038 A | 7/1980 | Silverman et al. |
| 4,227,805 A | 10/1980 | Schiller |
| 4,253,086 A | 2/1981 | Szwarcbier |
| 4,321,672 A | 3/1982 | Braun |
| 4,322,163 A | 3/1982 | Schiller |
| 4,353,056 A | 10/1982 | Tsikos |
| 4,358,677 A | 11/1982 | Ruell et al. |
| 4,390,968 A | 6/1983 | Hennessy |
| 4,429,413 A | 1/1984 | Edwards |
| 4,484,328 A | 11/1984 | Schlafly |
| 4,537,484 A | 8/1985 | Fowler et al. |
| 4,544,267 A | 10/1985 | Schiller |
| 4,582,985 A | 4/1986 | Lofberg |
| 4,618,988 A | 10/1986 | Schiller |
| 4,649,563 A | 3/1987 | Riskin |
| 4,675,815 A | 6/1987 | Kuroki |
| 4,696,046 A | 9/1987 | Schiller |
| 4,699,149 A | 10/1987 | Rice |
| 4,720,869 A | 1/1988 | Wadia |
| 4,728,186 A | 3/1988 | Eguchi et al. |
| 4,734,858 A | 3/1988 | Schlafly |
| 4,747,050 A | 5/1988 | Brachtl et al. |
| 4,752,966 A | 6/1988 | Schiller |
| D298,536 S | 11/1988 | Brefka |
| 4,784,484 A | 11/1988 | Jensen |
| 4,790,564 A | 12/1988 | Larcher et al. |
| 4,799,156 A | 1/1989 | Shavit et al. |
| 4,805,223 A | 2/1989 | Denyer |
| 4,821,118 A | 4/1989 | Lafreniere |
| 4,837,422 A | 6/1989 | Dethloff et al. |
| 4,845,636 A | 7/1989 | Walker |
| 4,868,376 A | 9/1989 | Lessin et al. |
| 4,926,480 A | 5/1990 | Chaum |
| 4,946,276 A | 8/1990 | Chilcott |
| 4,947,028 A | 8/1990 | Gorog |
| 4,947,443 A | 8/1990 | Costello |
| 4,961,142 A | 10/1990 | Elliott et al. |
| 4,993,068 A | 2/1991 | Piosenka et al. |
| 4,995,086 A | 2/1991 | Lilley et al. |
| 4,998,279 A | 3/1991 | Weiss |
| 5,025,372 A | 6/1991 | Burton |
| 5,036,461 A | 7/1991 | Elliott et al. |
| 5,054,089 A | 10/1991 | Uchida et al. |
| 5,054,090 A | 10/1991 | Knight et al. |
| 5,056,019 A | 10/1991 | Schultz et al. |
| 5,073,950 A | 12/1991 | Colbert et al. |
| 5,077,803 A | 12/1991 | Kato et al. |
| 5,088,817 A | 2/1992 | Igaki et al. |
| 5,095,194 A | 3/1992 | Barbanell |
| 5,103,486 A | 4/1992 | Grippi |
| 5,105,467 A | 4/1992 | Kim et al. |
| 5,109,427 A | 4/1992 | Yang |
| 5,109,428 A | 4/1992 | Igaki et al. |
| 5,144,680 A | 9/1992 | Kobayashi |
| 5,145,102 A | 9/1992 | Minato et al. |
| 5,146,102 A | 9/1992 | Higuchi et al. |
| 5,161,204 A | 11/1992 | Hutcheson et al. |
| 5,168,520 A | 12/1992 | Weiss |
| 5,180,901 A | 1/1993 | Hiramatsu |
| 5,191,611 A | 3/1993 | Lang |
| 5,210,588 A | 5/1993 | Lee |
| 5,210,797 A | 5/1993 | Usui et al. |
| 5,222,152 A | 6/1993 | Fishbine et al. |
| 5,224,164 A | 6/1993 | Eisner |
| 5,224,173 A * | 6/1993 | Kuhns et al. ............... 382/116 |
| 5,229,764 A | 7/1993 | Matchett et al. |
| 5,230,025 A | 7/1993 | Fishbine |
| 5,239,583 A | 8/1993 | Parrillo |
| 5,241,606 A | 8/1993 | Horie |
| 5,251,259 A | 10/1993 | Mosley |
| D340,919 S | 11/1993 | Lee |
| 5,265,162 A | 11/1993 | Bush et al. |
| 5,267,324 A | 11/1993 | Kumagai |
| 5,274,695 A | 12/1993 | Green |
| 5,276,314 A | 1/1994 | Martino et al. |
| 5,280,527 A | 1/1994 | Gullman et al. |
| 5,280,627 A | 1/1994 | Flaherty et al. |
| 5,321,242 A | 6/1994 | Heath, Jr. |
| 5,321,765 A | 6/1994 | Costello |
| 5,325,442 A | 6/1994 | Knapp |
| 5,329,589 A | 7/1994 | Fraser et al. |
| 5,335,288 A | 8/1994 | Faulkner |
| 5,343,529 A | 8/1994 | Goldfine et al. |
| 5,351,303 A | 9/1994 | Willmore |
| 5,354,974 A | 10/1994 | Eisenberg |
| 5,359,669 A | 10/1994 | Shanley et al. |
| 5,371,794 A | 12/1994 | Diffie et al. |
| 5,371,797 A | 12/1994 | Bocinsly, Jr. |
| 5,383,113 A | 1/1995 | Kight et al. |
| 5,386,104 A | 1/1995 | Sime |
| 5,400,662 A | 3/1995 | Tamori |
| 5,412,738 A | 5/1995 | Brunelli et al. |
| 5,416,573 A | 5/1995 | Sartor, Jr. |
| 5,429,006 A | 7/1995 | Tamori |
| 5,457,747 A | 10/1995 | Drexler |
| 5,465,290 A | 11/1995 | Hampton et al. |
| 5,465,303 A | 11/1995 | Levison et al. |
| 5,466,919 A * | 11/1995 | Hovakimian ................ 705/17 |
| 5,466,919 A | 11/1995 | Hovakimian |
| 5,469,506 A | 11/1995 | Berson et al. |
| 5,484,988 A | 1/1996 | Hills et al. |
| 5,485,510 A | 1/1996 | Colbert |
| D367,044 S | 2/1996 | Arakaki |
| 5,493,621 A | 2/1996 | Matsumura |
| 5,499,288 A | 3/1996 | Hunt et al. |
| 5,513,272 A | 4/1996 | Bogosian, Jr. |
| 5,517,558 A | 5/1996 | Schalk |
| 5,533,123 A | 7/1996 | Force et al. |
| 5,534,855 A | 7/1996 | Shockley et al. |
| 5,546,471 A * | 8/1996 | Merjanian ................... 382/124 |
| 5,546,523 A | 8/1996 | Gatto |
| 5,561,718 A | 10/1996 | Trew et al. |
| 5,572,597 A | 11/1996 | Chang et al. |
| 5,577,120 A | 11/1996 | Penzias |
| 5,578,808 A | 11/1996 | Taylor |
| 5,594,806 A | 1/1997 | Colbert |
| 5,598,474 A | 1/1997 | Johnson |
| 5,602,933 A | 2/1997 | Blackwell et al. |
| 5,604,802 A | 2/1997 | Holloway |
| 5,613,102 A | 3/1997 | Chiang et al. |
| 5,615,277 A | 3/1997 | Hoffman |
| 5,621,812 A | 4/1997 | Deaton et al. |
| 5,635,723 A | 6/1997 | Fujieda et al. |
| 5,636,038 A | 6/1997 | Lynt et al. |
| 5,636,282 A | 6/1997 | Holmquist |
| 5,647,364 A | 7/1997 | Schneider et al. |
| 5,650,217 A | 7/1997 | Skrivanek et al. |
| 5,655,116 A | 8/1997 | Kirk et al. |
| 5,677,989 A | 10/1997 | Rabin et al. |
| 5,719,950 A | 2/1998 | Osten et al. |
| 5,745,555 A | 4/1998 | Mark |
| 5,748,780 A | 5/1998 | Stolfo |
| 5,757,917 A | 5/1998 | Rose et al. |
| 5,764,789 A | 6/1998 | Pare, Jr. et al. |
| 5,768,134 A | 6/1998 | Swaelens et al. |
| 5,770,849 A | 6/1998 | Novis et al. |
| 5,787,187 A | 7/1998 | Bouchard et al. |
| 5,790,668 A | 8/1998 | Tomko |

| | | | | | | |
|---|---|---|---|---|---|---|
| 5,794,207 | A | 8/1998 | Walker et al. | 6,496,107 | B1 | 12/2002 | Himmelstein |
| 5,796,857 | A | 8/1998 | Hara | 6,522,772 | B1 | 2/2003 | Morrison et al. |
| D397,682 | S | 9/1998 | Yotukura | 7,133,792 | B2 | 11/2006 | Murakami et al. |
| 5,802,199 | A | 9/1998 | Pare, Jr. et al. | 7,152,787 | B2 | 12/2006 | Cheng |
| 5,805,719 | A | 9/1998 | Pare, Jr. et al. | 2001/0000045 | A1 | 3/2001 | Yu et al. |
| D400,191 | S | 10/1998 | Butts et al. | 2001/0000535 | A1 | 4/2001 | Lapsley et al. |
| 5,822,737 | A | 10/1998 | Ogram | 2001/0011247 | A1 | 8/2001 | O'Flaherty et al. |
| 5,825,907 | A | 10/1998 | Russo | 2001/0033661 | A1 | 10/2001 | Prokoski |
| 5,825,924 | A | 10/1998 | Kobayashi | 2001/0034837 | A1 | 10/2001 | Kausik et al. |
| 5,826,241 | A | 10/1998 | Stein et al. | 2001/0044775 | A1 | 11/2001 | Saito et al. |
| 5,826,245 | A | 10/1998 | Sandberg-Diment | 2003/0061172 | A1 | 3/2003 | Robinson |
| 5,832,464 | A | 11/1998 | Houvener et al. | | | | |
| 5,838,812 | A | 11/1998 | Pare, Jr. et al. | | | | |
| 5,844,287 | A | 12/1998 | Hassan et al. | | | | |
| 5,845,005 | A | 12/1998 | Setlak et al. | | | | |
| 5,848,400 | A | 12/1998 | Chang | | | | |
| 5,850,442 | A | 12/1998 | Muftic | | | | |
| 5,870,723 | A | 2/1999 | Pare, Jr. et al. | | | | |

FOREIGN PATENT DOCUMENTS

| | | | |
|---|---|---|---|
| EP | 0598469 A2 | 5/1994 |
| EP | 0 651 357 A1 | 5/1995 |
| EP | 0823701 A2 | 2/1998 |
| EP | 0652 540 B1 | 9/2000 |
| JP | S57-212851 | 12/1982 |
| JP | S59-36860 | 2/1984 |
| JP | 61-187838 | 8/1986 |
| JP | S63-003369 | 1/1988 |
| JP | 63-120385 | 5/1988 |
| JP | 63-261492 | 10/1988 |
| JP | 03-189756 | 8/1991 |
| JP | 03-288954 | 12/1991 |
| JP | 04-322382 | 11/1992 |
| JP | 04-324583 | 11/1992 |
| JP | 05-62057 | 3/1993 |
| JP | 05-250524 | 9/1993 |
| JP | 06-149980 | 5/1994 |
| JP | 06-176135 | 6/1994 |
| WO | WO94/10659 | 5/1994 |
| WO | WO95/13591 | 5/1995 |
| WO | WO98/25227 | 6/1997 |
| WO | WO98/09227 | 3/1998 |
| WO | WO98/50875 | 11/1998 |
| WO | WO99/28847 | 6/1999 |

(Continuation of US patent list:)

| | | | |
|---|---|---|---|
| 5,876,926 A | 3/1999 | Beecham |
| 5,892,824 A | 4/1999 | Beatson et al. |
| 5,892,838 A | 4/1999 | Brady |
| 5,910,988 A | 6/1999 | Ballard |
| 5,926,555 A | 7/1999 | Ort et al. |
| 5,930,804 A | 7/1999 | Yu et al. |
| 5,933,515 A * | 8/1999 | Pu et al. ............ 382/124 |
| 5,935,071 A | 8/1999 | Schneider et al. |
| 5,943,235 A | 8/1999 | Earl et al. |
| 5,943,423 A | 8/1999 | Muftic |
| 5,956,700 A | 9/1999 | Landry |
| 5,982,914 A | 11/1999 | Lee et al. |
| 5,986,746 A | 11/1999 | Metz et al. |
| 5,991,372 A | 11/1999 | Davenport D'Ingianni et al. |
| 6,011,858 A | 1/2000 | Stock et al. |
| 6,012,039 A | 1/2000 | Hoffman et al. |
| 6,016,476 A | 1/2000 | Maes et al. |
| 6,023,688 A | 2/2000 | Ramachandran et al. |
| 6,023,783 A | 2/2000 | Divsalar et al. |
| 6,028,950 A | 2/2000 | Merjanian |
| 6,029,195 A | 2/2000 | Herz |
| 6,040,783 A | 3/2000 | Houvener et al. |
| 6,041,309 A * | 3/2000 | Laor ............ 705/14 |
| 6,045,039 A | 4/2000 | Stinson et al. |
| 6,052,675 A | 4/2000 | Checchio |
| 6,064,751 A | 5/2000 | Smithies et al. |
| 6,070,141 A | 5/2000 | Houvener et al. |
| 6,072,894 A | 6/2000 | Payne |
| 6,073,840 A | 6/2000 | Marion |
| 6,084,967 A | 7/2000 | Kennedy et al. |
| 6,105,010 A | 8/2000 | Musgrave |
| 6,111,977 A | 8/2000 | Scott et al. |
| 6,119,096 A | 9/2000 | Mann et al. |
| 6,154,727 A | 11/2000 | Karp et al. |
| 6,154,879 A | 11/2000 | Pare, Jr. et al. |
| 6,182,076 B1 | 1/2001 | Yu et al. |
| 6,192,142 B1 | 2/2001 | Pare, Jr. et al. |
| 6,202,151 B1 | 3/2001 | Musgrave et al. |
| 6,208,746 B1 | 3/2001 | Musgrave |
| 6,219,439 B1 | 4/2001 | Burger |
| 6,230,148 B1 | 5/2001 | Pare, Jr. et al. |
| 6,233,565 B1 | 5/2001 | Lewis et al. |
| 6,233,618 B1 | 5/2001 | Shannon |
| 6,256,737 B1 | 7/2001 | Bianco et al. |
| 6,260,024 B1 | 7/2001 | Shkedy |
| 6,268,788 B1 | 7/2001 | Gray |
| 6,269,348 B1 | 7/2001 | Pare, Jr. et al. |
| 6,275,944 B1 | 8/2001 | Kao et al. |
| 6,310,966 B1 | 10/2001 | Dulude et al. |
| 6,311,272 B1 | 10/2001 | Gressel |
| 6,327,578 B1 | 12/2001 | Linehan |
| 6,366,682 B1 | 4/2002 | Hoffman et al. |
| 6,377,228 B1 | 4/2002 | Jenkin et al. |
| 6,397,198 B1 | 5/2002 | Hoffman et al. |
| 6,411,728 B1 | 6/2002 | Lee et al. |

OTHER PUBLICATIONS

Holmes, et al., "A Performance Evaluation of Biometric Identification Devices": Sandia National Laboratories; Albuquerque, NM; Jun. 1991.

Anderson, T.; "Security Management"; v. 37, No. 11; Nov. 1993; pp. 17-19.

Lange, et al.; "Digital Identification; It's Now at our Fingertips", *Electronic Engineering Times*; No. 946; Mar. 24, 1997; p. 142.

Radcliff; "When Data Warehouse Become Open House"; *Software Management*; v. 16, No. 11; Nov. 26, 1996.

Anonymous; A Credit Union Points a Finger at Biometrics; *Bank Network News*; v. 15, No. 16; Jan. 13, 1997.

Hall, J; "Scanning Lets Fingerprints Do Talking"; *Toronto Star*; PA6, May 15, 1997.

Scally, R.; "CompUSA Tests Fingerprints to Help Secure Transactions"; *Discount Store News*; v. 36, No. 10, May 19, 1997.

Stosz, et al. "Automated System for Fingerprint Authentication Using Pores and Ridge Structure"; *Proceedings of The International Society for Optical Engineering*; v. 2277; Jul. 28-29, 1994; pp. 210-223.

Recently Granted Patents in the USA—Sep. 1998; Transponder News; (5 pages).

Toll, Janie "Veridicom Showcases New Customers and Applications at COMDEX"; Press Release; Nov. 16, 1998; 3 pages.

Kolor, Joanna; "Biometric Technology Goes Live" *Bank Network News*; May 1, 1996; 7 pages.

State of Virginia, Department of Social Services; "What Are Food Stamps"; Nov. 10, 2005 (1 page).

"Biometric ID Cards", story from Totse.com, Feb. 1996.

"Biometric payment firm Pay By touch secures $10 million funding", story from Finextra.com, Oct. 2003.

"Biometrics Comparison Chart", ncsc.dni.us, 2002.

"Is it Time for Biometrics?", Banking Automation Bulletin for Europe, London, Sep. 1992, Issue 115, p. 1 (ProQuest document ID 7415352).

"Pay By Touch announces first UK Customer", May 2004.

"Supermarkets and Shopper Registration Guide", from Nocards.org., downloaded, Dec. 26, 2007.

"TCP Protocol Overview" downloaded Dec. 26, 2007.

"Why do you call them 'registration and monitoring' programs?", question from CASPIAN, Nocards.org., 2005.

Cavoukian, Ann, "Consumer Biometric Applications: A Discussion Paper", Information and Privacy Commissioner, Ontario, Canada. Sep. 1999.

Cavoukian, Ann, Ph. D., "Building in Privacy", May 14-16, 1996. http://www.cpsr.org/cpsr/lists/rre/building_in_privacy. Online 2004.

Rechtin, Mark, "Fingerprint Technology Makes for Best ID System," Orange County Business Journal, Newport Beach, May 14, 1990, vol. 12, Issue 51, Sec. 1, p. 7 (Proquest document ID 6020297).

* cited by examiner

SYSTEM AND METHOD FOR TOKENLESS BIOMETRIC ELECTRONIC SCRIP

CROSS REFERENCE

This application is a division of U.S. application Ser. No. 10/734,851, filed on Dec. 11, 2003, now abandoned, which is a division of U.S. application Ser. No. 09/441,107, filed on Nov. 16, 1999, now abandoned, which is a continuation of U.S. application Ser. No. 09/244,784, filed on Feb. 5, 1999, now U.S. Pat. No. 6,012,039, which is a continuation-in-part of U.S. application Ser. No. 08/705,399, filed on Aug. 29, 1996, now U.S. Pat. No. 5,870,723, which is a continuation-in-part of U.S. application Ser. No. 08/442,895, filed on May 17, 1995, now U.S. Pat. No. 5,613,012, which is a continuation-in-part of U.S. application Ser. No. 08/345,523, filed on Nov. 28, 1994, now U.S. Pat. No. 5,615,277, all of which are herein incorporated by reference in their entirety for all intents and purposes.

FIELD OF THE INVENTION

The invention relates generally to electronic computer systems designed to calculate and store scrip. More specifically, this invention relates to tokenless biometric computer systems which do not require a person who support scrip programs to use any man-made portable memory devices such as smart cards or magnetic swipe cards when conducting an electronic scrip transaction.

BACKGROUND

Scrip systems have become a popular part of retail point of sale and internet commerce marketing. Scrip is a system whereby an individual person, known herein as a Scrip Supporter, can make donations to a pre-designated non-profit entity (Scrip Beneficiary) based on that person's usage patterns within the designated scrip system or program. Currently, over $2 billion is raised annually by non-profit organizations annually via such scrip programs.

There are several embodiments of scrip systems or programs. Scrip is defined as any unit of data, such as currency, products or services, which is honored by a Scrip Merchant such that a Scrip Supporter's purchase, expenditure or usage of these units results in the Scrip Supporter's donation of goods, services or currency to a pre-designated non-profit entity (Scrip Beneficiary). Such scrip may be actual tender in the form of gift certificates, stored-value cards or paper coupons having a pre-determined dollar value. As such, each unit of scrip has a tender or real face value when used with the participating scrip program merchant. Scrip can also include minutes of telephone calling time, miles towards earning a free airplane flight, points towards a gallon of gas, and the like.

In one example, these scrip may be purchased directly from the merchant by the non-profit entity at a discount on their face-value. In this case, the discount to the Scrip Beneficiary may be a percentage based on volume, such that when pre-purchasing a $100 volume of scrip, the Scrip Beneficiary may pay only $95 for the scrip total actual tender or face value of $100. The Scrip Beneficiary re-sells these scrip to its Scrip Supporters for the full price, or the full face-value, of the scrip. The Scrip Beneficiary thereby keeps the dollar differential as a means for raising funds for its programs. The Scrip Supporters then bring the scrip directly to the participating merchant to make purchases for goods or services.

Another example involves a Scrip Supporter registering any or all of their existing financial accounts, such as debit, credit or stored value accounts, for use in a donation program to benefit what is often a tax-deductible, non-profit or charitable Scrip Beneficiary that has pre-registered with the system. Examples of such non-profit entities are public schools, churches, civic organizations, and the like. Participating merchants will enable Scrip Supporters to automatically make donations to enrolled non-profit organizations, based on service usage, expenditures or purchases by Scrip Supporters. The Scrip Supporters can do this using their registered debit and credit accounts by automatically tendering a pre-designated percentage or fixed dollar surcharge per transaction directly to the Scrip Beneficiary via draft or electronic funds transfer (EFT). The Scrip Supporter can then track these electronic donations for tax-deduction purposes.

Another example involves a Scrip Supporter's use of certain services or purchase of certain products, resulting in a participating merchant itself donating goods, services, or currency directly to a participating Scrip Beneficiary.

Therefore, scrip programs enable a participating merchant to benefit from new sales to Scrip Supporters, while a Scrip Beneficiary can benefit by having raised funds through several programs. In addition, the Scrip Supporter may benefit: a) by having obtained pre-paid scrip towards the purchase of desired goods or services at no additional premium than the Scrip Supporter would have otherwise paid when making those purchasing via traditional means at the participating merchant, or; b) by having a tax-deductible percentage or automatic surcharge on their purchases through participating merchants, donated to their selected Scrip Beneficiary based on their use of registered financial accounts.

However, current scrip programs rely on portable tokens such as financial account cards or paper scrip coupons, and this is disadvantageous. Namely, it is costly to produce and distribute such tokens to Scrip Supporters. Furthermore, as cards and paper scrips are lost, damaged, or stolen, merchants and non-profit entities often absorb the cost of replacing them to the consumer. For example, if a stored value card or a paper coupon containing pre-paid scrip is stolen or lost, a fraudulent party can present such a portable scrip token in order to obtain the cost-savings or other benefits to which they are not rightfully entitled. Therefore, another problem with such tokens is that there is a tenuous link between the token and the actual identity of the authorized Scrip Supporter. As a result, the merchant or the Scrip Beneficiary may have to bear the cost of inadvertently providing these incentives to a consumer who does not have the requisite pre-payments or purchasing patterns to benefit from them. Hence, the merchant or the non-profit may literally be rewarding the wrong party and paying twice for this mistake. This is because the original consumer will likely demand from the merchant or the non-profit their rightful scrip even without having the token to authenticate their account. The merchant will thereby have to pay for the scrip for that genuine consumer as well. Therefore, there are few, if any, mechanisms in this system for establishing the correct identity of a Scrip Supporter and validating their authority to obtain or use scrip.

The use of various biometrics, such as fingerprints, hand prints, voice prints, retinal images, handwriting samples and the like have been suggested for authenticating the identification of individuals. A biometric is any distinct human characteristic which can uniquely identify an individual. However, because the biometrics are generally stored in electronic (and thus reproducible) form on a token and because the comparison and verification process is not isolated from the hardware and software directly used by the Scrip Supporter attempting access, the problem of having to carry cards is not alleviated. Further, such systems do not adequately isolate the identity verification process from tampering by someone attempting to gain unauthorized access. Examples of this approach to system security are described in U.S. Pat. No. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; U.S. Pat. No. 5,109,427 to Yang; U.S. Pat. No. 5,109,428 to Igaki et al.; U.S. Pat. No. 5,144,680 to Kobayashi et al.; U.S. Pat. No. 5,146,102 to Higuchi et al.; U.S. Pat. No. 5,180,901 to Hiramatsu; U.S. Pat. No. 5,210,588 to Lee; U.S. Pat. No. 5,210,797 to Usui et al.; U.S. Pat. No. 5,222,152 to Fishbine et al.; U.S. Pat. No. 5,230,025 to Fishbine et al.; U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; U.S. Pat. No. 5,351,303 to Willmore, all of which are incorporated herein by reference.

An example of a token-based security system which relies on a biometric of a person can be found in U.S. Pat. No. 5,280,527 to Gullman et al. In Gullman's system, the person must carry and present a credit card sized token (referred to as a biometrics security apparatus) containing a microchip in which is recorded characteristics of the authorized person's voice. In order to initiate the access procedure, the person must insert the token into a terminal such as a public kiosk, and then speak into the terminal to provide a biometrics input for comparison with an authenticated input stored in the microchip of the presented token. The process of identity verification is generally not isolated from potential tampering by one attempting unauthorized access. If a match is found, the remote terminal may then signal the host computer that access should be permitted, or may prompt the person for an additional code, such as a PIN (also stored on the token), before sending the necessary verification signal to the host computer.

Although Gullman's reliance of comparison of stored and input biometrics potentially reduces the risk of unauthorized access as compared to numeric codes, like personal identification numbers, Gullman's use of the token as the repository for the authenticating data combined with Gullman's failure to isolate the identity verification process from the possibility of tampering greatly diminishes any improvement to fraud resistance resulting from the replacement of a numeric code with a biometrics. Further, the system remains cumbersome and inconvenient to use because it too requires the presentation of a personalized memory token in order to initiate an access request.

Almost uniformly, prior art disclosing biometrics are token-based systems which teach away from biometrics recognition without dependence on personalized memory tokens. Reasons cited for such teachings range from storage requirements for biometrics recognition systems to significant time lapses in identification of a large number of individuals, even for the most powerful computers.

In view of the foregoing, there has long been a need for an electronic scrip transaction system that is completely tokenless, ensuring Scrip Supporter convenience by providing authorization without requiring the Scrip Supporter to possess, carry, and present one or more proprietary tokens containing stored data customized for the Scrip Supporter, such as man-made portable memory devices, in order to accumulate the scrip, expend scrip units, or make scrip donations to their desired Scrip Beneficiary. Anyone who has lost a card, left it at home, had a card stolen knows well the keenly and immediately-felt inconvenience caused by such problems.

Therefore, there is a need for an electronic biometric scrip transaction system that is entirely tokenless.

There is a further need for a computerized electronic scrip transaction system that uses a strong, secure, non-transferable link to the person being identified, as opposed to merely verifying a Scrip Supporter's possession of any physical objects that can be freely transferred. Therefore, there is a need for an electronic scrip transaction system that relies on Scrip Supporter biometrics, such as finger images, facial scans, voice prints, iris or retinal scans, and the like. Such a biometric is any distinct human characteristic which can uniquely identify an individual.

There is another need in the industry for a scrip system that is sufficiently versatile to accommodate both Scrip Supporters who desire to use personal identification numbers (PINs) for added security and also Scrip Supporters who prefer not to use them.

Lastly, such a system must be affordable and flexible enough to be operatively compatible with existing networks having a variety of electronic transaction devices and scrip system configurations.

As such, it is an objective of the invention to provide an electronic scrip system and method that is completely tokenless and eliminates the need for a Scrip Supporter to directly possess any personalized, portable man-made token which is encoded or programmed with data personal to or customized for a single authorized Scrip Supporter, such as a smart card, magnetic swipe card or a personal computer with resident Scrip Supporter-specific data.

It is another object of the invention to provide a computer system that is capable of verifying a Scrip Supporter's identity from convenient, secure and non-transferable data, as opposed to merely verifying his possession of propriety objects and information. Therefore it is an objective of this invention that the system use a biometric sample with unique physical characteristics and which is obtained directly from the person of the Scrip Supporter. One such biometric sample is registered with the computer system and another is provided when the Scrip Supporter conducts a scrip transaction. These two biometric samples are compared by an electronic identicator, which is a computer that uses this comparison to validate or deny the identity of the Scrip Supporter.

Yet another object of the invention is to provide a computer system wherein access is secure, yet designed to be convenient and easy for a Scrip Supporter to use.

Yet another object of the invention is to enable a Scrip Supporter to donate scrip which are either immediately provided to a pre-designated Scrip Beneficiary or are stored for later access by the Scrip Beneficiary.

Another objective of this invention is that it function at both with merchants at the retail point of sale and with merchants over the internet.

Another objective of the invention is that the scrip participating entity, whether a Scrip Merchant or a Scrip Beneficiary, be identified by an electronic identicator, wherein the Scrip Merchant's identification is verified. Therefore, the Scrip Merchant would register with the electronic identicator some identification data, which may consist of any of the following data: a hardware ID code, a phone number, an email address, a street address, a digital certificate, an account number, a biometric, or a biometric and PIN combination.

Another objective of the invention is to be added in a simple and cost-effective manner to existing terminals currently installed at points of sale and used over the internet.

Yet another objective of the invention is to be efficiently and effectively operative with existing financial transactions systems and protocols, specifically as these systems and protocols linked to the processing of electronic scrip programs.

SUMMARY OF THE INVENTION

The present invention satisfies these needs by providing an improved system and method for tokenless authorization of an electronic scrip transaction using at least one scrip supporter biometric sample and an electronic identicator. The preferred embodiment of the method comprises the steps of a scrip supporter registration step, wherein a scrip supporter registers with an electronic identicator at least one registration biometric sample, an electronic scrip transaction proposal step, comprising electronic scrip donator account data, at least one transmittal step, wherein a scrip supporter bid biometric sample is obtained from the scrip supporter's person and is electronically transmitted to the electronic identicator, a scrip supporter identification step, wherein the electronic identicator compares the bid biometric sample with at least one registration biometric sample for producing either a successful or failed identification of the scrip supporter, wherein upon successful identification of the scrip supporter, a scrip transaction is biometrically authorized, without the scrip supporter presenting any personalized man-made tokens such as smartcards or magnetic swipe cards.

Another embodiment further comprises at least one local identicator containing a subset of all of the registered scrip supporter biometric samples in the electronic identicator.

Yet another embodiment comprises an electronic clearinghouse creation step, wherein a clearinghouse is created containing at least one rule module. Preferably the rule module within the electronic clearinghouse contains at least one pattern data that is associated with at least one execution command. Pattern data comprise any of the following: a unique scrip supporter identification code, demographic information, an email address, at least one pre-determined formula for scrip donations, secondary biometric, a telephone number, a mailing address, purchasing patterns, a digital certificate, a network credential, an Internet protocol address, a digital signature, and an encryption key. An execution command comprises instructions for accessing at least one electronic registry that contains any one of the following; at least one scrip donator account and at least one scrip beneficiary account. Preferably, the electronic registry is located on an computer that is external to the authorization system.

In an alternative embodiment the system method further comprises at least one local clearinghouse containing a subset of all of the rule modules in the scrip transaction system.

In yet another embodiment, the method further comprises a scrip merchant identification step, wherein the electronic identicator compares a scrip merchant bid identification data with a scrip merchant registered identification data for producing either a successful or failed identification of the scrip merchant. Furthermore, the scrip merchant identification data comprises any one of the following; a hardware identification code, a telephone number, an email address, a digital certificate code, an account index, an electronic account number, a biometric, or a biometric and personal identification number combination. Additionally, in the scrip merchant identification step, the electronic identicator communicates with one or more external computers to access scrip merchant identification data.

Preferably the method further comprises at least one scrip beneficiary identification step, wherein the electronic identicator compares a scrip beneficiary bid identification data with a scrip beneficiary registered identification data for producing either a successful or failed identification of the scrip beneficiary. The scrip beneficiary identification data comprises any one of the following; a hardware identification code, a telephone number, an email address, a digital certificate code, an account index, an electronic account number, a biometric, or a biometric and personal identification number combination. Furthermore, in the scrip beneficiary identification step the electronic identicator further communicates with one or more external computers to access scrip beneficiary identification data.

In another embodiment, the scrip supporter registration step further comprises registering a scrip supporter personal identification number with the electronic identicator.

Preferably, the method further comprising a scrip donator account resource determination step, wherein it is determined if a scrip donator account has sufficient resources to be debited for an amount specified in the scrip transaction. Additionally, the method comprises a transaction settlement step, wherein a scrip donator account is debited and a scrip beneficiary account is credited. Preferably, in the transaction settlement step, the electronic identicator communicates with one or more external computers to access an electronic registry comprising any of the following: scrip donator account data and scrip beneficiary account data.

Furthermore, preferably, the electronic scrip transaction proposal step further comprises scrip transaction data, wherein the scrip transaction data comprises any of the following: price information, a list of goods, a list of services, a scrip merchant name, a date or time, a location, and an invoice number. Additionally, a future date on which scrip is to be debited from the scrip donator account and credited to the scrip beneficiary account is included in the transaction settlement step.

In an alternative embodiment, the method further comprises a scrip supporter re-registration check step, wherein the scrip supporter's registration biometric samples are compared against previously registered biometric samples wherein if a match occurs, the computer system is alerted to the fact that the scrip supporter has attempted to re-register with the electronic identicator.

In the preferred method the scrip donator account is controlled by any of following: a scrip merchant, a scrip participating manufacturer, and a scrip supporter. The scrip may comprise any unit of the following: gift certificates, stored-value units, electronic or paper coupons having a pre-determined dollar value, minutes of telephone calling time, miles towards earning a free airplane flight, points towards receiving a commodity or service.

In yet another embodiment, the scrip donator account comprises any of the following: a stored value account and a financial account, and the beneficiary account comprises any of the following: a stored value account and a financial account.

Preferably, the method further comprises a notification step, wherein after settlement of the transaction, notification of the results of the transaction settlement step and scrip account activity is presented to any of the following: a scrip supporter; a scrip merchant; a scrip beneficiary.

The tokenless electronic scrip transaction authorization device comprises at least one electronic scrip supporter registration biometric sample, an electronic identicator for comparing a scrip supporter bid biometric sample with the at least one scrip supporter registration biometric sample to produce a successful or failed identification result, an electronic scrip donator account data, wherein upon successful identification of the scrip supporter, a scrip transaction is biometrically authorized, without the scrip supporter presenting any personalized man-made tokens such as smartcards or magnetic swipe cards.

The present invention is significantly advantageous over the prior art in a number of ways. The invention is clearly advantageous from a convenience standpoint to Scrip Merchants and scrip institutions by making scrip transactions electronic, tokenless and biometric-based so that such transactions are less cumbersome, more spontaneous, and highly secure. As defined herein, an electronic scrip transaction is any exchange or redemption of scrip in an electronic mode.

The paperwork of tokenless biometric scrip transactions is significantly less than that required with standard couponing and scrip transactions wherein the copies of the scrip-coupons must often be retained by the Scrip Merchant or the Scrip Supporter. Even the traditional requirement for internet electronic transactions of the buyer needing to directly possess and use the ultimate personalized token, a personal computer with resident buyer-specific data, will be eliminated. Further, the substantial manufacturing and distributing costs of issuing and reissuing all personalized tokens such as paper coupons, magnetic swipe scrip cards, and smart scrip cards, thereby providing further economic savings to issuing merchants, businesses, and ultimately to consumers.

Additionally, this tokenless biometric scrip system is easy and efficient for people to use because it eliminates the need for Scrip Supporters to remember or directly possess any personalized tokens such as paper scrips, magnetic swipe cards or personal computers with resident Scrip Supporter-specific data, in order to access their authorized pre-paid scrip accounts. The present invention therefore eliminates all the inconveniences associated with carrying, safeguarding, and locating such tokens. The consumer is now uniquely empowered, by means of this invention, to conveniently conduct his electronic scrip transactions at any time without dependence upon tokens which may be stolen, lost or damaged.

Further, the present invention is also clearly advantageous from a convenience standpoint of Scrip Supporters by providing centralized database tracking and storage of scrip for Scrip Supporters, participating merchants, and scrip beneficiaries, thereby making scrip programs more cost-effective and accurate with regard to the monitoring of scrip donations and calculations. Additionally, such a centralized system for tokenless biometric electronic scrip, enables the system to transcend geography restrictions. The Scrip Supporter can assist the non-profit of his choice regardless of his own geographic location since he does not. Further, extended family and friends who live in and out of a Scrip Beneficiary's geographic region can also register and participate, supporting worthwhile programs.

Moreover, the invention is markedly advantageous and superior to existing systems in being highly fraud resistant. The present invention virtually eliminates the risk of granting access to scrip by unauthorized Scrip Supporters by determining identity from an analysis of a Scrip Supporter's unique biometric characteristics. The invention further enhances fraud resistance by maintaining authenticating data and carrying out the identity verification operations at a point in the system that is operationally isolated from the Scrip Supporter requesting access, thereby preventing an unauthorized Scrip Supporter from acquiring copies of the authenticating data or from tampering with the verification process. Such a system is clearly superior to existing token-based systems wherein authenticating information, such as biometrics or personal codes, is stored on and can be recovered from the token, and wherein the actual identity determination is potentially in operational contact with the Scrip Supporter during the access process.

Further, an embodiment of the invention identifies the designated non-profit Scrip Beneficiary through use of the Identicator, thereby reducing the likelihood of fraudulent entities making money or earning the benefits of scrip in place of the rightfully registered, authentic Scrip Beneficiary.

Further, the invention is designed to be cost-effectively integrated with existing electronic data systems currently installed in corporate intranets and over the Internet.

These and other advantages of the invention will become more fully apparent when the following detailed description of the invention is read in conjunction with the accompanying drawings.

DETAILED DESCRIPTION

Figure 1:
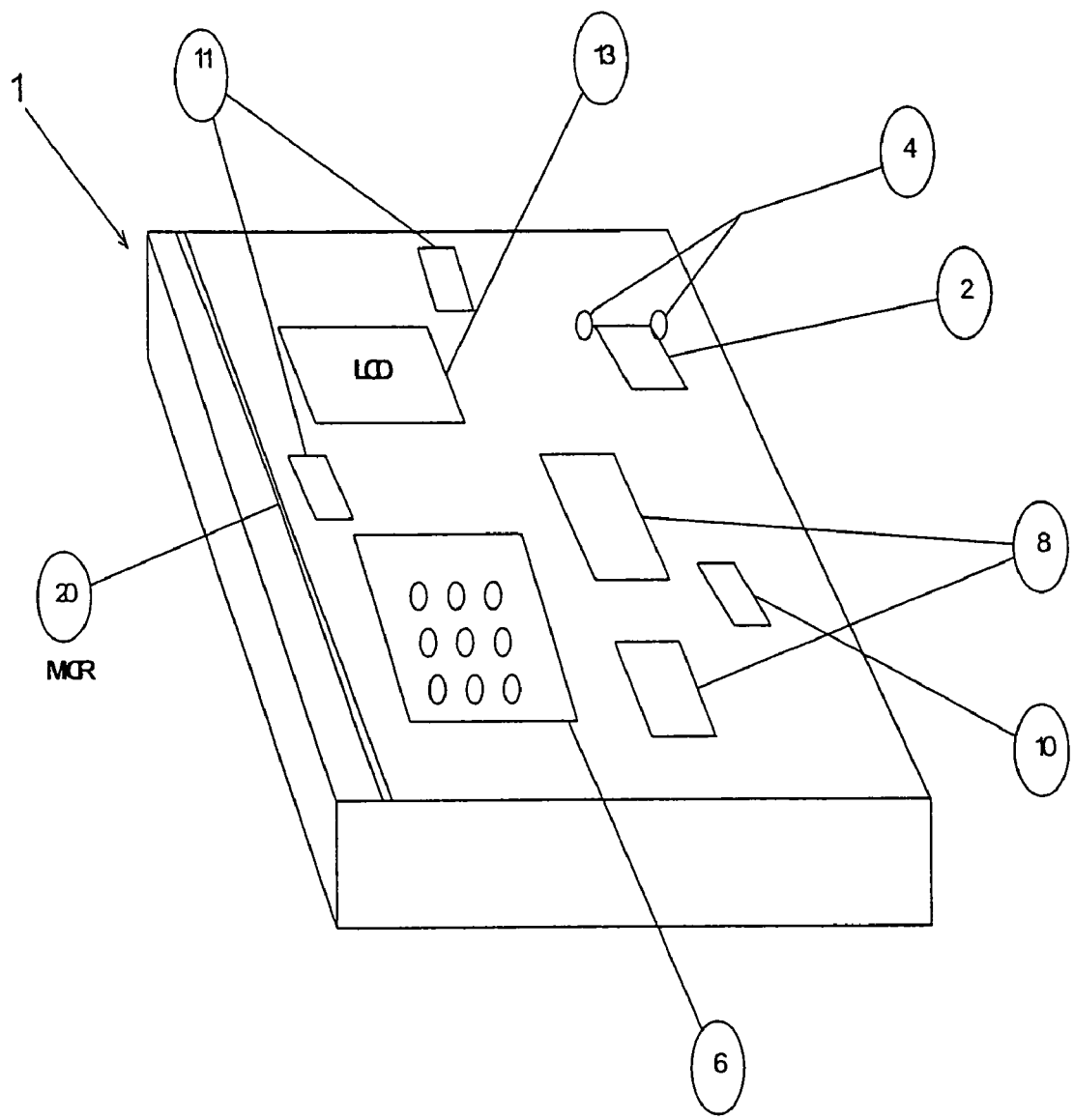
FIG. 1 shows the preferred embodiment of a Party Identification Device (PDA) with a biometric sensor and key pad.

The invention provides a tokenless biometric method for a scrip supporter to authorize a scrip transactions using scrip accounts either at the retail point of sale or over the Internet. It is the essence of this invention that the Scrip Supporter not be identified through the direct use any man-made personalized tokens to effect a scrip transaction. A computer system and an Identicator are used to accomplish these goals.

A biometric sample is defined as any distinct human characteristic which can uniquely identify an individual. A biometric sample includes any of the following: a fingerprint or finger image, a voice print, a retinal scan, an iris scan, a facial image, and the like.

One such biometric sample is registered with the computer system and another is provided when the Scrip Supporter conducts a scrip transaction. These two biometric samples are compared by an electronic identicator (electronic Identicator or Identicator), which is a computer that uses this comparison to validate or deny the identity of the Scrip Supporter.

Scrip is defined as any unit of data, such as currency, products or services, which is honored by a Scrip Merchant such that a Scrip Supporter's purchase, expenditure or usage of these units results in the donation of goods, services or currency to the designated Scrip Beneficiary. Such scrip may be actual tender in the form of gift certificates, stored-value cards or paper coupons having a pre-determined dollar value. As such, each unit of scrip has a tender or real face value when used with the participating scrip program merchant. Scrip can also be minutes of telephone calling time, miles towards earning a free airplane flight, points towards a gallon of gas, and the like.

A scrip account is defined as an account that contains any of the following: a) pre-purchased scrip deposited in a stored value account, or; b) a registered financial account which is designated to donate scrip based upon the Scrip Supporter's purchases. An electronic scrip donator account (Scrip Donator Account) is an account controlled by a Scrip Supporter or optionally a participating scrip merchant (Scrip Merchant), from which scrip is debited as a result of an electronic scrip transaction. An electronic scrip beneficiary account (Scrip Beneficiary Account) is an account controlled by a Scrip Beneficiary which is a recipient of scrip. The beneficiary is credited as a result of an electronic scrip transaction.

A scrip participating merchant (Scrip Merchant) is any provider of goods or services, such as: a standard brick-and-mortar point of sale merchant; an on-line internet based merchant; a service provider; or a product manufacturer. Such scrip participating entities may include a phone company, a athletic apparel manufacturer, a book or music vendor, an internet service provider, a supermarket, and the like.

A scrip beneficiary (Scrip Beneficiary) is any entity to which donations of scrip is made based upon the participation of any of its Scrip Supporters. Such scrip beneficiaries may include civic organizations, churches, schools, and the like.

A Scrip Supporter is any individual person who participates in a program to donate scrip to a non-profit entity based upon his purchases, expenditures, or service usages.

At least one biometric sample is registered with the computer system and a bid biometric sample is provided when the Scrip Supporter conducts a scrip transaction. These two biometric samples are compared by an electronic identicator, which is a computer that uses this comparison to identify the Scrip Supporter.

Scrip is defined as any unit of data, such as currency, products or services, which is honored by a Scrip Merchant such that a Scrip Supporter's purchase, expenditure or usage of these units results in the donation of goods, services or currency to a designated Scrip Beneficiary. Such scrip may be actual tender in the form of gift certificates, stored-value cards or paper coupons having a pre-determined dollar value. As such, each unit of scrip has a tender or real face value when used with the participating scrip program merchant. Scrip can also be minutes of telephone calling time, miles towards earning a free airplane flight, points towards a gallon of gas, and the like.

A scrip account is defined as an account that contains any of the following: a) pre-purchased scrip deposited in a stored value account, or; b) a registered financial account which is designated to donate scrip based upon the Scrip Supporter's purchases. An electronic scrip donator account (Scrip Donator Account) is an account controlled by a Scrip Supporter or a scrip participating merchant (Scrip Merchant), from which scrip is debited as a result of an electronic scrip transaction. An electronic scrip beneficiary account (Scrip Beneficiary Account) is an account controlled by a recipient of scrip donations (Scrip Beneficiary), to which scrip is credited as a result of an electronic scrip transaction.

A scrip participating merchant (Scrip Merchant) is any provider of goods or services, such as: a standard brick-and-mortar point of sale merchant; an on-line internet based merchant; a service provider; or a product manufacturer. Such scrip participating entities may include a phone company, a athletic apparel manufacturer, a book or music vendor, an internet service provider, a supermarket, and the like.

A scrip beneficiary (Scrip Beneficiary) is any entity to which donations of scrip is made based upon the participation of any of its Scrip Supporters. Such scrip beneficiaries may include civic organizations, churches, schools, and the like.

A Scrip Supporter is any individual person who participates in a program to donate scrip to a Scrip Beneficiary based upon his purchases of goods or services.

The Scrip Supporter forwards at least one biometric sample obtained from their person to the Data Processing Center (DPC) 22 via a Party Data Apparatus (PDA) 1. The transmittal of the scrip transaction optionally occurs over a network 18 such as an intranet, extranet or the Internet, whether using a local area network (LAN) or wide area network (WAN). It is the essence of this invention that the Scrip Supporter not present any man-made personalized tokens during an identification process in order for an electronic scrip transaction to be authorized. Such tokens include smart cards, magnetic swipe cards, or personal computers with resident Scrip Supporter-customized data.

An embodiment of the tokenless biometric scrip transactions is characterized by identifying the Scrip Supporter using the Scrip Supporter's bid biometric sample 62 that is submitted through a PDA 1. The PDA 1 is preferably directly connected via dial-up, leased lines or wireless modem 56 to the Internet 18. Alternatively, a bid biometric sample is submitted or through a PDA 1 in an intranet 58 or through a PDA 1 incorporated to any terminal such as an electronic cash register, a desktop personal computer, a notebook computer, or a public terminal or kiosk such as an Automated Teller Machine (ATM). In a preferred embodiment, the Scrip Supporter is identified through biometrics while participating entities 28 such as scrip merchants or non-profit beneficiaries are identified through the verification of a digital certificate issued by an authorized certifying authority.

Execution of a Rule Module (RM) 50 or an Execution Command (EC) 52 by the Execution Module (Execution Modules) 38 may result in a declined transmission due to an unidentifiable bid biometric sample, a lack of an identifiable Scrip Merchant or Scrip Beneficiary 28, a closed or inoperative participating Scrip Merchant or Scrip Beneficiary 28, or some other immediately detectable problem condition. If the transmission is declined, the electronic Registry 14 or the Identicator 12 transmits the decline notification back to the PDA 1.

In one embodiment, the PDA 1 is actually built-in and/or integrated with a personal computer, although the invention does not require that the personal computer contain any resident Scrip Supporter-customized data, such as Pattern Data (PD) 54, Execution Commands 52 or private encryption keys.

The electronic Identicator (or Identicator) system comprises the following components:
Party Data Apparatus (PDA)
Communication lines
Data Processing Center (DPC)

These components together allow a scrip transaction to occur without requiring the Scrip Supporter to use scrip cards, paper coupons, credit cards, debit cards, or any other physical objects.

Party Data Apparatus (PDA)

The PDA is a device that gathers or contains identity information for use in authorizing scrip transactions. Each PDA conducts one or more of the following operations:
gather biometric input from a Scrip Merchant or Scrip Supporter
gather a PIN code or password from a Scrip Merchant or Scrip Supporter secure communication between PDA and DPC using encryption secure storage of secret encryption keys store and retrieve a unique Scrip Merchant PDA hardware identification code secure enclosure & components from unauthorized tampering display information, allow parties to approve or cancel a scrip transaction automated data scanning, such as a magnetic ink character reader, a magnetic stripe reader or a bar-code reader store, verify, and retrieve a Scrip Merchant's digital identification code or a Scrip Beneficiary's digital identification code allow parties to select among choices of Scrip Merchant and Scrip Supporter accounts A preferred embodiment containing these components is shown in FIG. 1.

Biometric input is gathered using a biometric sensor 2 located within the PDA 1. Biometric sensor 2 is a finger image sensor, however it is understood that other types of biometric sensors such as biometrics, such as hand prints, voice prints, retinal images, handwriting samples, iris scanning, facial images and others are also used.

For PDAs requiring a fingerprint sensor, the PDA has a biometric fraud detection mechanism 4 that will assure that any biometric input gathered from the biometric sensor is from a real physical person, instead of a copy or replica. Preferably for the finger image sensor, this is a blood flow detector.

For systems employing a PIN, PIN input is preferably gathered using a keypad or PIN pad 6 that is also located securely inside the PDA.

Communication security is provided by encryption using unique secret keys known only to that specific PDA and the DPC, and the DES encryption algorithm, preferably triple-encrypted. Triple encryption means successive encrypt/decrypt/encrypt operations using two distinct 56-bit DES keys. This provides significantly higher security than a single encryption operation with one 56-bit DES key. Alternately, a public/private key system may also be used to encrypt information that passes between PDA and DPC. Both DES and public key encryption is well known in the industry.

The PDA also has secure memory 8 that can store and retrieve the unique secret encryption keys used to enable secure communications with the DPC. In this embodiment, this is battery backed-up RAM that is set up to be erased whenever the tamper-detect circuitry reports that tampering has been detected.

To use encryption keys, a key management system must be employed to assure that both sender and receiver are using the same key. When using DES, a preferred key management system is DUKPT, which is well known in the industry. DUKPT is designed to provide a different DES key for each transaction, without leaving behind the trace of the initial secret key. The implications of this are that even successful capture and dissection of a PDA will not reveal messages that have previously been sent, a very important goal when the effective lifetime of the information transmitted is years. DUKPT is fully specified in ANSI X9.24. The DUKPT key table is stored in the secure memory.

Each PDA preferably has a hardware identification code that is registered with the DPC at the time of manufacture. This makes the PDA uniquely identifiable to the DPC in all scrip transactions from that device. This hardware identification code is stored in write-once memory 10.

PDA physical security is assured by standard mechanisms. Preferably, these comprise tamper-detect circuitry 11, an enclosure that cannot be easily opened without visibly injuring the enclosure, erasable memory for critical secrets such as encryption keys, write-once memory for hardware identification, tight integration of all components, and "potting" of exposed circuitry.

Information such as the amount of a transaction, the identity of a Scrip Supporter, or other transaction-related information is displayed using an integrated LCD screen 13. It is preferable that the LCD screen be connected securely to the other components in the PDA 1 to maintain security.

Approval or cancellation of a scrip transaction is done using the PDA keypad.

The automated data scanner 20 is used to read encoded about the Scrip Supporter, the participating merchant or the scrip beneficiary. This is used during initial registration to link any such data to the Scrip Supporter's biometric identity.

Further data which is linked during registration to the Scrip Supporter's biometric may include: a driver's license number, a passport number, a debit account, a credit account, a checking account, a money-market account, a stored-value account containing pre-paid scrip, and the like. Optionally, a stored value account with a participating merchant may be pre-credited with funds, or scrip, from the Scrip Beneficiary and for the use of which the Scrip Supporter has pre-paid a premium to the Scrip Beneficiary.

Optionally, the PDA 1 also validates public key digital certificates. In one embodiment, public keys of a particular certifying authority are initially stored in the PDA 1 at the time of construction. This provides the mechanism to verify a Scrip Merchant's digital certificates that are signed by the certifying authority, or a Scrip Beneficiary's digital certificates that are signed by the certifying authority.

Although a preferred embodiment is described above, there are many different variations on specific PDA 1 implementations. Fundamentally any device that is secure, can identify a Scrip Supporter, a Scrip Merchant or a Scrip Beneficiary with a high degree of certainty, and can connect to the DPC 22 via some form of communication line can serve as a PDA 1.

In some embodiments, specifically the home use and public use instances, the PDA hardware identification code is not used to identify either the Scrip Merchant or the Scrip Supporter.

Registration

Parties that wish to either originate or receive scrip transactions must first register with the Identicator 12. The identification and scrip information registered with the system for a given party depends on the mode used to originate or receive settlement. A Scrip Supporter must register at least one biometric or a biometric-PIN, as well as a scrip account, along with establishing a scrip electronic clearinghouse that can govern the deposit, display, deducting, and disbursing of scrip and scrip account data using at least one scrip account. In the case of a Scrip Beneficiary receiving electronic transfer of scrip, the beneficiary must also register: identification data unique to that Scrip Merchant or Scrip Beneficiary, such as a digital certificate, and; a scrip account that can receive the Scrip Supporter's donated scrip. A Scrip Merchant, usually a corporate entity, or a Scrip Beneficiary, usually a non-profit entity, must register identification data unique to that entity, such as a digital certificate, their PDA hardware identification codes.

A Scrip Supporter registers by submitting a registration biometric sample obtained from their physical person by the PDA's biometric sensor. The PDA 1 determines that the biometric scan is non-fraudulent, and then translates and compresses that biometric scan into a format suitable for rapid scrip transaction to the DPC 22. In one embodiment, the Scrip Supporter selects and enters a PIN code into the PDA keypad.

Next, the person associates at least one scrip account with the registration biometric sample in the system. Preferably, this is accomplished by automatically scanning a bar-code or a magnetic stripe through the data reader attached to the PDA 1. In one embodiment, this bar-code or magnetic stripe contains not only the Scrip Supporter's scrip account number, but also the identity of the Scrip Merchant or financial institution with which this account is associated.

Preferably, an attendant verifies that the Scrip Supporter actually owns the scrip account by comparing personal photo id (a driver's license, passport, id card, etc) to the name listed on the scrip card.

The PDA 1 transmits the registration data to the DPC 22. The DPC 22 then inserts the biometric (or biometric-PIN) into the appropriate Identicator 12 database and generates a Scrip Supporter ID Code that is unique to the Scrip Supporter. From this point on, any time the Scrip Supporter is identified by the Identicator 12, the Scrip Supporter ID Code is forwarded to the electronic Clearinghouse 14 where it invokes at least one Rule Module 50 for that Scrip Supporter. In the electronic Clearinghouse 14 database, a Rule Module 50 is created that is identified by the Scrip Supporter ID Code. In one embodiment, before a new biometric (or biometric-PIN) record is enabled to originate or execute a scrip transaction, the individual's submitted biometrics are checked against previously registered biometric samples in the electronic Identicator 12 using the same biometric comparison techniques as those used in the individual identification procedure. If a match is found for the newly submitted biometric record, the biometric record's status is set to "prior registration". If the prior registration check was executed as part of a registration request, the Gateway Machine 26 logs a "registering individual with prior registration" warning, indicating that the person has attempted to register with the system more than once.

In one embodiment, the DPC 22 validates the scrip account data submitted during registration. This involves making certain that the scrip account being registered is a valid account.

Regarding a scrip Scrip Merchant or a Scrip Beneficiary, any Scrip Merchant or Scrip Beneficiary may register identification data that is unique to that entity, such as an alphanumeric identification code, a digital certificate, or a PDA hardware identification code to identify itself to the DPC 22. Digital certificates are available from certifying authorities, and they provide the assurance that the entity with the certificate is the authentic owner of that identity. These certificates contain readable text and other information that describes the entity. This can include a corporate logo, the address, as well as the company name.

This entity identification data is then linked to at least one Scrip Donator Account or a Scrip Beneficiary Account. These scrip accounts are respectively used to electronically debit or credit scrip when the entity identification data is used to identify the Scrip Beneficiary.

PDA hardware identification codes are unique numbers assigned to PDA 1 devices at the time of manufacture. A participating merchant installing PDA 1 devices at the point of sale can register PDAs 1 with the DPC 22. This causes any transaction, either registration or purchase, flowing through those registered PDAs 1 to automatically identify the participating merchant which owns the hardware identification code.

Preferably, the security surrounding the registration of an entity's digital certificates or PDA hardware identification codes to scrip account numbers is extremely strong, as this is a potential source for large losses over a short period of time.

Communication Lines

Communications between the PDA 1 and the Identicator 12 occur via many different communication methods. Most depend on the particular communication networks already deployed by the organization or retailer that deploys the transmission authorization system.

In an embodiment the PDAs 1 are connected via Ethernet to a local router, which is itself connected to a network operations center (NOC) via frame relay lines. At least one Identicator 12 is located at the NOC. Messages are sent from PDA 1 to the Identicator 12 using TCP/IP over this network. In another embodiment, the PDAs 1 are connected via a cellular digital packet data (CDPD) modem to a CDPD provider, who provides TCP/IP connectivity from the PDA 1 to an intranet 58 to which at least one Identicator 12 is attached.

In yet another embodiment, a PDA 1 is connected via the Internet, as is at least one Identicator 12. TCP/IP is used to transmit messages from PDA 1 to Identicator 12. There are many different ways to connect PDA 1 to Identicator 12, both tethered and wireless, that are well understood in the industry, including but not limited to: the Internet; an intranet; an extranet; a local area network ("LAN"); and a wide area network ("WAN").

Scrip Transactions

Scrip transactions optionally occur at a retail point of sale, across a network such as an intranet or the Internet, or at home or public terminal.

Data Processing Center

Data Processing Centers (DPC) 22 serve to identify the Scrip Merchant and the Scrip Supporter in a transaction, retrieve scrip and scrip account information for identified parties, and perform the execution that will result in settlement of transactions and scrip delivery to a Scrip Beneficiary for the scrip transaction. The Data Processing Center 22 is comprised of an electronic Identicator 12, an electronic Clearinghouse 14, an internal Execution Module 38, a Firewall 24, a Decryption Module 29, a Gateway Machine 26, and a Logging Facility 36.

Figure 2:
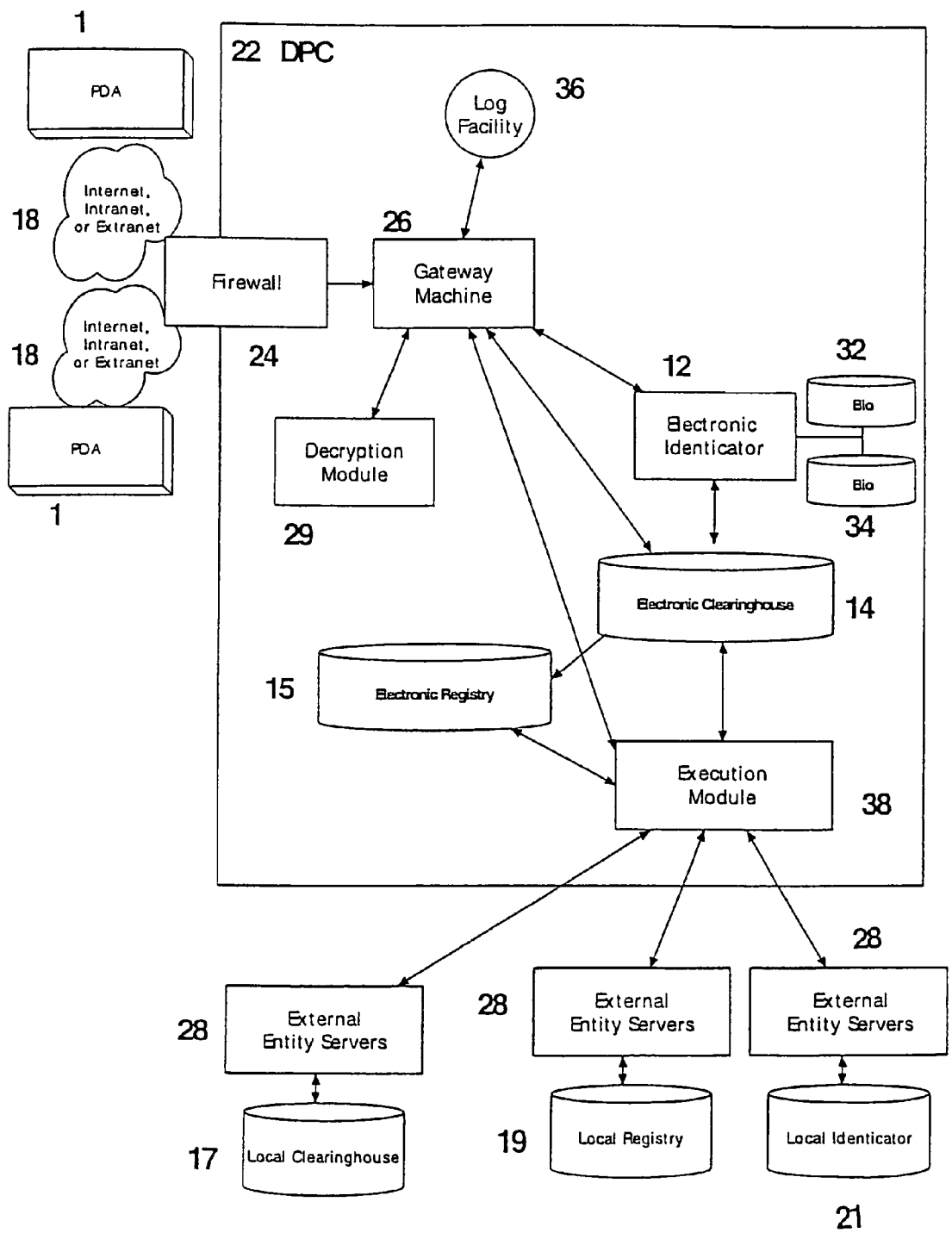
FIG. 2 is a preferred embodiment of the Data Processing Center (DPC) showing the connections between its components.

As seen in FIG. 2, the DPC 22 is connected to a network, like the Internet 18 or intranet 18, using a firewall machine 24 that filters out all messages that are not from legitimate PDA 1 devices.

In a preferred embodiment, the messages are decrypted. For this, the transaction processor uses the decryption module (DM) 29, which utilizes the hardware identification code of the PDA 1 to identify the encryption codes that is required to decrypt the message from the PDA 1.

Once decrypted, the identity of parties to the transaction is determined using the electronic Identicator 12.

Electronic Identicator

The electronic Identicator 12 (Identicator) serves to identify the Scrip Supporter in an electronic scrip transaction. The Identicator 12 compares a Scrip Supporter's bid biometric sample 62 with previously stored biometric samples from registered Scrip Supporters, in order to identify the Scrip Supporter. If a bid biometric sample 62 is successfully matched against a registered biometric sample, and the Scrip Supporter is positively identified, the Supporter ID Code which had been assigned to the Scrip Supporter during initial registration will be forwarded to the electronic Clearinghouse 14. The Supporter ID Code transmitted by the Identicator 12 is used by the electronic Clearinghouse 14 to locate the Rule Modules 50 that are customized to that Scrip Supporter.

As seen in FIG. 2, the Identicator 12 is connected to the Internet 18 or intranet 58 using a firewall machine 24. Messages are sent to a Gateway machine 26, which is responsible for overseeing the steps required to process the scrip transaction, including forwarding the scrip transaction to the Identicator 12 and the electronic Clearinghouse 14.

Preferably, electronic messages transmitted between the PDA 1 and the DPC 22 are encrypted. For this, the scrip transaction processor uses the Decryption Module (DM) 29, which utilizes the hardware identification code of the PDA 1 to identify the encryption codes that is required to decrypt messages from the PDA 1. Once decrypted, the identity of the Scrip Supporter is determined using Identicator 12, which provides storage, retrieval and comparison of biometric samples 62.

In an embodiment, during the Scrip Supporter identification step, the Identicator 12 requests the Scrip Supporter to submit their PIC, and this PIC is used by the Identicator 12 in combination with the Scrip Supporter's bid biometric sample 62 for purposes of validating the identity of the Scrip Supporter.

In another embodiment, the Identicator 12 provides periodic Scrip Supporter re-identification queries. In this embodiment, in order for a Scrip Supporter to extend an on-line session, the Scrip Supporter is requested by the Identicator 12 to re-identify themselves using any of the following: a Scrip Supporter bid biometric sample 62 or Pattern Data 54, such as a personal identification code ("PIC").

In another embodiment, a Scrip Merchant or a Scrip Beneficiary is also identified by the Identicator using any of the following electronic verification means: a entity ID Code, a digital certificate, an Internet protocol ("IP") address, a biometric, a hardware identification number, or any other code, text or number that uniquely identifies the entity. In this way, the Identicator 12 is enabled to provide the Scrip Supporter with confirmation that the correct entity participated in the electronic scrip transaction. Examples include confirming that the correct web site or remote database was accessed by the Scrip Supporter, that the correct entity designee received the Scrip Supporter's email or instant message, and the like.

In another embodiment, the Identicator 12 module is integrated with the electronic Clearinghouse 14 module.

In a preferred embodiment, more than one Identicator 12 provides fault tolerance from either natural or man-made disasters. In this embodiment, each Identicator 12 uses a backup power generator, redundant hardware, mirrored databases, and other standard fault tolerant equipment known in the industry.

Identification of the entity and the Scrip Supporter occurs using different methods, depending on the identification information that is provided by the PDA 1. The Identicator has subsystems for each type of information that is received by the Identicator, and each subsystem is highly optimized to provide rapid identification as outlined below.

In a preferred embodiment, Identicator 12 comprises subsystems that can identify parties from the following information:

biometric data and personal identification code (PIC)

biometric data alone digital identification (digital certificates)

PDA hardware identification code

Biometric Identification Subsystem (BID)

In one embodiment of the Identicator, the BID subsystem comprises at least two BID processors, each of which is capable of identifying Scrip Supporters only from their biometric sample.

In one embodiment, each BID processor contains the entire database of biometrics. To distribute the scrip transactions evenly across processors without undue effort, the Identicator determines randomly which BID processor will be used for a given electronic scrip transaction, and delegates the identification request to that BID processor. That BID processor performs a search of its biometric sample database in order to find a matching registered biometric sample. In another embodiment, there is a scrip supporter re-registration check step, wherein the Scrip Supporter's registration biometric samples are compared against previously registered biometric samples wherein if a match occurs, the computer system is alerted to the fact that the Scrip Supporter has attempted to re-register with the electronic Identicator.

In another embodiment, other information is present that assists the BID processor in searching the database. For finger images, this includes information such as the classification of the image (whirl, arch, etc.), and other information about the finger ridge structure that is useful for selecting out biometrics that are not likely to match (or information on biometrics that are likely to match). Such biometric-based sorting and classification systems using mathematical algorithms, are known in the art for fingerprints and for other biometrics such as retina of the eye, voice print, and face vascular patterns.

Biometric comparisons are often more accurate if multiple biometrics are used. This includes the same type of biometrics from an individual such as fingerprint samples from different fingers, or different types of biometric samples such as a finger print and a voice print. In some embodiments, multiple biometrics are used to more rapidly and more accurately identify individuals.

Biometric-PIC Identification Subsystem (BPID)

Figure 5:
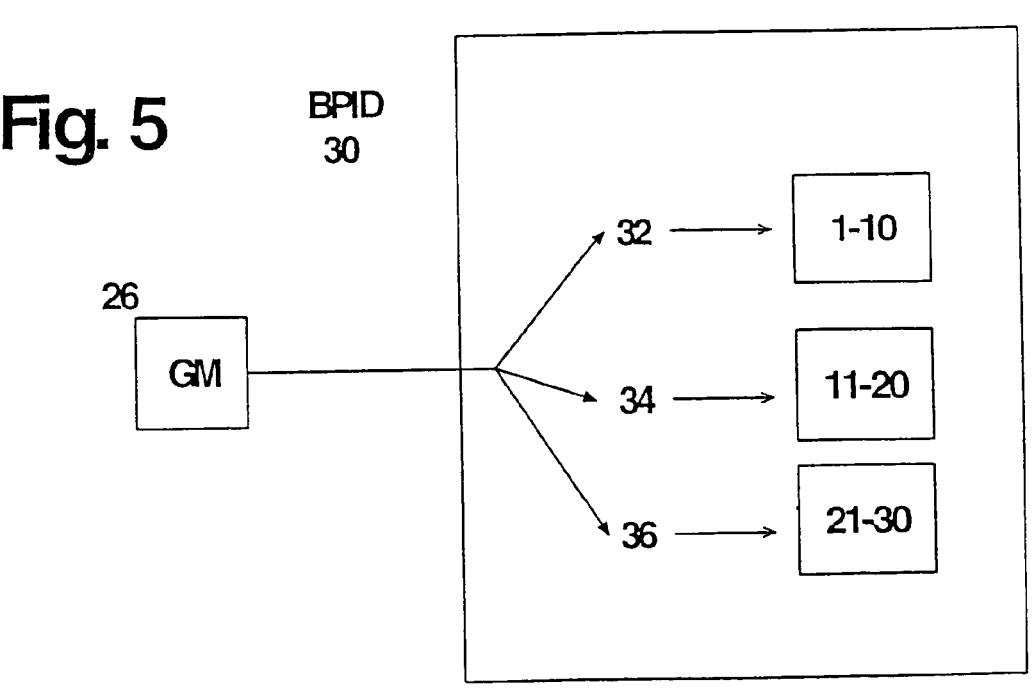
FIG. 5 shows an embodiment of the Biometric-PIN identification mechanism where the transaction processor determines a Biometric-PIN from the Biometric-PIN Identification subsystem is responsible for a given subdivision of the biometric database.

As shown in FIG. 5, in a preferred embodiment, the BPID subsystem 30 comprises at least two BPID processors, each of which is capable of identifying parties from their biometric and personal identification codes.

Preferably, the database of parties identifiable from biometric-PIC combinations is distributed equally across all BPID processors. Each processor is responsible for a subset of identifications.

The Identicator determines which Biometric-PIC from the BPID subsystem 30 is responsible for a given subdivision of the biometric database. In one embodiment, one BPID 32 is responsible for identifying people with PICs 1-10, another BPID 34 is responsible for identifying PICs 11-20, and a third BPID 36 is responsible for identifying PICs 21-30. For example, all messages from the PDA 1 containing a PIC that equals the number 30 would be routed to BPID 36 for identification of the Scrip Supporter.

Once a BPID processor receives a bid biometric sample 62 and PIC for identification, the processor searches through its database, retrieving all registered biometric samples that match or correspond to that particular bid PIC. Once all corresponding registered biometric samples are retrieved, the Identicator 12 compares the bid biometric samples obtained from the electronic scrip transaction to all retrieved registered biometric samples. If a match occurs, the Identicator transmits the identity of the Scrip Supporter or the Supporter ID Code to the electronic Clearinghouse 14. If no match is found, the Identicator transmits a "not identified" message back to gateway machine 26 and to the logging facility 36.

In one embodiment, there is a biometric theft resolution step, wherein the scrip supporter's personal identification number is changed if the scrip supporter's biometric sample is determined to have been fraudulently duplicated.

Digital Identification Subsystem

In a preferred embodiment, the Digital Identification subsystem comprises multiple processors, each of which is capable of identifying an entity from their digital certificates. In this embodiment, digital certificates are used to perform digital identification of an entity. Preferably, these include corporate web site addresses and certifying authorities only. Where possible, computers provide digital certificates for identification of the entity, and Scrip Supporters use their biometrics for identification of the Scrip Supporter.

Verifying that a particular digital certificate is valid requires a public key from the certifying authority that issued that particular digital certificate. This requires that the digital identification subsystem have a list of certifying authorities and the public keys used to validate the digital certificates they issue. This table must be secure, and the keys stored therein must be kept up to date. These processes and others relating to the actual process for validating digital certificates are well understood in the industry.

PDA Hardware Identification Subsystem (PHI)

In a preferred embodiment, PDA hardware identification codes are translated into entity identification by the PHI subsystem. This subsystem maintains a list of all PDAs 1 manufactured. Preferably, when a particular Scrip Supporter uses a PDA 1, that Scrip Supporter's geographic location is identified by their use of that particular PDA 1 during that electronic scrip transaction session.

In another embodiment, the PDA hardware identification code does not serve to identify either the Scrip Supporter or an entity. This is the case in PDAs 1 installed in public venues such as airport terminals, Automated Teller Machines in banks, or computers with PDAs 1 for home use.

Scrip Supporter ID Code

A Supporter ID Code or Scrip Supporter ID Code is an electronic message transmitted to the electronic Clearinghouse 14, which informs the electronic Clearinghouse 14 that a Scrip Supporter has been successfully identified, and instructs the electronic Clearinghouse 14 to invoke the Rule Modules 50 for that particular Scrip Supporter.

Electronic Clearinghouse

In a preferred embodiment, once the Scrip Supporter is identified by the Identicator 12, the Supporter ID Code is forwarded to the electronic Clearinghouse 14. The electronic Clearinghouse 14 instructs the Execution Module 38 to take the necessary steps for executing the Execution Commands 52 that are associated with the Pattern Data 54 registered with the electronic Clearinghouse 14.

Rule Modules

The electronic Clearinghouse 14 is comprised of at least one Rule Module 50 which is indexed specifically to one or more registered Scrip Supporters (hence, "Scrip Supporter-customized"). Therefore, the Rule Modules 50 are optionally not unique or exclusive to a single Scrip Supporter. The electronic Clearinghouse 14 functions as a central storage facility for registering, indexing, updating, and invoking various Rule Modules 50, whereby the Rule Modules govern the deposit, the display, the deducting, and the dispensing of scrip. Each of these Rule Modules 50 is composed of at least one Pattern Data 54 which is associated with or electronically linked to at least one Execution Command. As defined herein, Scrip Supporter-customized does not necessarily mean that any Pattern Data 54 or the Execution Command 52 is unique to a Scrip Supporter, but rather that they are indexed to or are assigned to a specific Scrip Supporter. As such, the same Pattern Data 54 or Execution Command 52 may be assigned to several specific Scrip Supporters, and hence would not be unique to any one Scrip Supporter.

The electronic Clearinghouse 14 optionally stores Scrip Supporter-customized Pattern Data 54 that is unassociated with any Scrip Supporter-customized Execution Commands 52 and optionally stores Scrip Supporter-customized Execution Commands 52 that are not associated with any Scrip Supporter-customized Pattern Data 54. Therefore, such unassociated Pattern Data 54 or Execution Commands 52 are optionally stored within the electronic Clearinghouse 14 until they are associated with a Pattern Data 54 or an Execution Command 52 together thereby forming an executable Rule Module.

In one embodiment, the Scrip Merchant registers with the electronic Clearinghouse 12 a roster of a Scrip Merchant's products or services each having a predetermined scrip value. The value for each unit of scrip could be a dollar amount, a number of minutes of telephone calling time, points towards the purchase of a product or service, a percentage discount on current or future purchases, and the like. The Scrip Merchant then designates the number of scrip to be disbursed to Scrip Supporters or Scrip Beneficiaries based upon the occurrence of predetermined criteria. This criteria may include a credit or debit of scrip in the Scrip Supporter's scrip account based on the Scrip Supporter's purchasing patterns as a function of any of the following: time, demographics, frequency, recency, and amount of expenditure.

Once the Scrip Supporter is identified by the Identicator 12, the Supporter ID Code is forwarded to the electronic Clearinghouse 14. The electronic Clearinghouse 14 takes the Supporter ID Code, optionally along with the PDA hardware ID code, the PDA 1 location data and the scrip transaction request, and searches among the Scrip Supporter's customized Rule Modules 50 to invoke all of the Pattern Data 54 relevant to the scrip transaction being undertaken.

In another embodiment, the electronic Clearinghouse 14 stores and manages the account balances of scrip for participating merchants, Scrip Supporters, and beneficiary entities. Further, The electronic Clearinghouse 14 may contain Execution Commands 52 to display the scrip account status, calculations, and adjustments, and the like for participating merchants, beneficiary entities, and Scrip Supporters.

Pattern Data (PD)

As previously noted, Pattern Data 54 may be provided by the Scrip Supporter, by the electronic Clearinghouse 14, or by an authorized scrip entity 28, while the Scrip Supporter provides at least one associated Execution Command 52, to form a single Rule Module 50.

Pattern Data 54 of a Scrip Supporter is stored electronic data, which is customized to at least one Scrip Supporter. A single Pattern Data 54 includes any of the following stored Scrip Supporter-customized electronic data: a personal identification code (PIC), which is optionally alpha-numeric; demographic information; an email address; a PDA hardware identification code; a financial account; a stored-value account containing pre-paid or pre-earned scrip; the Scrip Supporter's date of birth; a secondary biometric; a telephone number; Scrip Donator Account Data; Scrip Beneficiary Account Data; a mailing address; purchasing patterns; scrip accounting data; a Supporter ID Code. Although a Supporter ID Code is optionally used as Pattern Data 54, the Supporter ID Code is unique to each Scrip Supporter and is not shared between Scrip Supporters.

Any such Pattern Data 54 may be provided to the electronic Clearinghouse 14 by: a Scrip Supporter; an electronic Clearinghouse 14; an electronic Registry 15; or an authorized entity 28 such as a Scrip Merchant or a Scrip Beneficiary.

Execution Commands (ECs)

The Execution Commands 52 executed by the Execution Module 38 transmits electronic messages necessary for depositing, displaying, deducting, or disbursing scrip. Such Execution Commands may include: a pre-calculated formula for surcharging a Scrip Supporter's financial account during a financial transaction, such that said surcharge is automatically disbursed to a scrip beneficiary; a pre-designation that scrip accounts are to be displayed to the Scrip Supporter such that the Scrip Supporter can select which scrip account to invoke for the scrip transaction; a pre-designation that scrip beneficiary entities are displayed for the Scrip Supporter such that the Scrip Supporter may select which entity will be the beneficiary of the scrip transaction disbursement; a pre-designation that purchases from certain participating merchants will automatically invoke a scrip disbursal to at least one certain scrip beneficiary; a pre-designation that upon accumulation of certain types of scrip, such as frequent-flyer miles or free phone minutes, such types of scrip will be automatically disbursed to a pre-designated scrip beneficiary; Scrip Donator Account Data; Scrip Beneficiary Account Data; a pre-designation that upon accumulation of certain amounts of scrip, there will be a disbursal to at least one pre-designated scrip beneficiary; a pre-designation that upon one scrip beneficiary having received a certain quantity of scrip donations from the Scrip Supporter, perhaps even within a certain timeframe, the Scrip Supporter will be notified or further scrip disbursal will automatically transfer to a different beneficiary.

In one embodiment, a Rule Module 50 from the electronic Clearinghouse 14 contains an Execution Command 52 which permits a Scrip Merchant to itself contribute scrip directly to a Scrip Beneficiary based upon a Scrip Supporter's purchases. In such transactions, units of scrip are electronically debited from the Scrip Donator Account controlled by the Scrip Merchant, and corresponding units of scrip are electronically credited to the Scrip Beneficiary Account.

The electronic Clearinghouse's 14 Execution Commands 52 may further provide several execution designations including any of the following: immediate cash discounts or premium charges to a Scrip Supporter's scrip account during a commercial transaction; a deduction of scrip units from a Scrip Supporter's scrip account, and an immediate donation thereof via electronic funds transfer (EFT) to a Scrip Beneficiary; and an accrual of scrip which are credited towards a Scrip Supporter's future purchase of a product or service.

Figure 4:
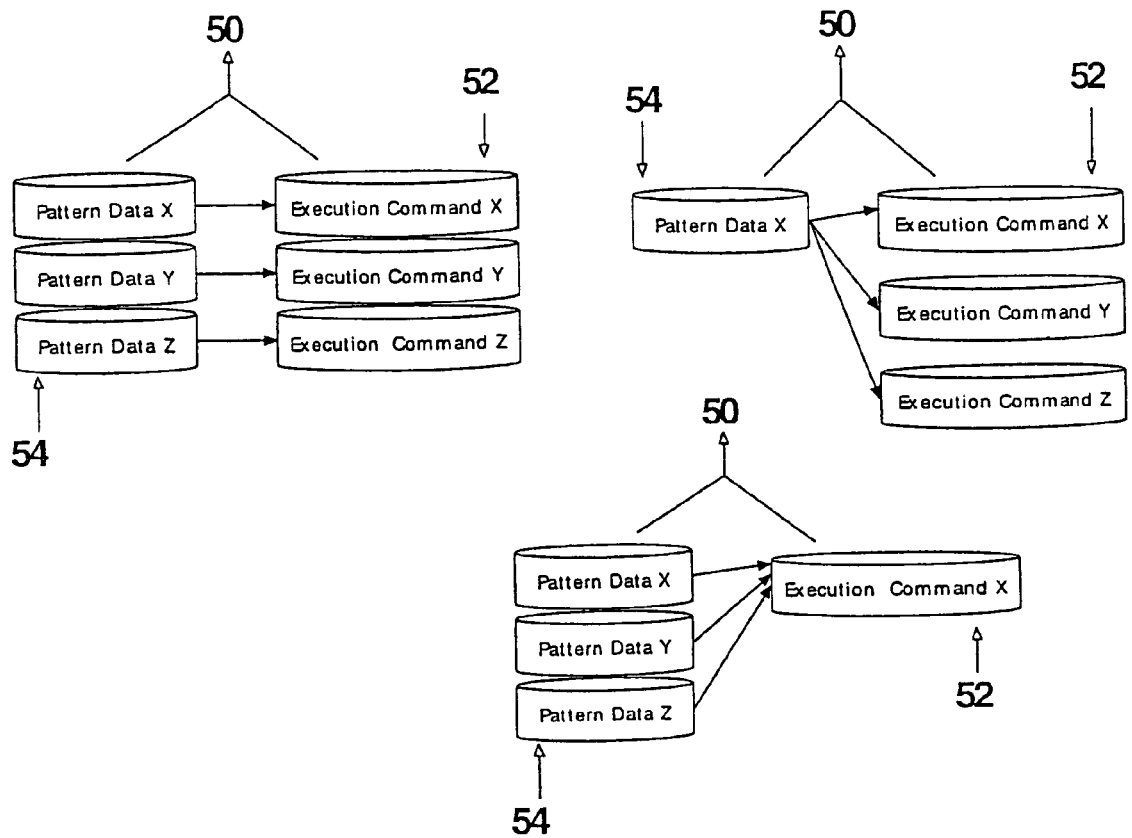
FIG. 4 shows an embodiment of the invention depicting rule modules wherein each rule module is composed of at least one pattern data and at least one execution command.

Any Execution Command 52 is invoked by any Pattern Data 54 with which it is associated. As shown in FIG. 4, in one embodiment, a single Pattern Data 54 is associated with multiple Execution Commands 52, thereby forming multiple Rule Modules 50. Also shown in FIG. 4 is another embodiment, where multiple Pattern Data 54 are associated with a single Execution Command, again forming multiple Rule Modules 50. Also shown in FIG. 4, another embodiment there is only one Pattern Data 45 associated with one Execution Command 52. Any Scrip Supporter-customized Execution Command 52 may be provided to the electronic Clearinghouse 14 by the Scrip Supporter.

Electronic Registry

Figure 3:
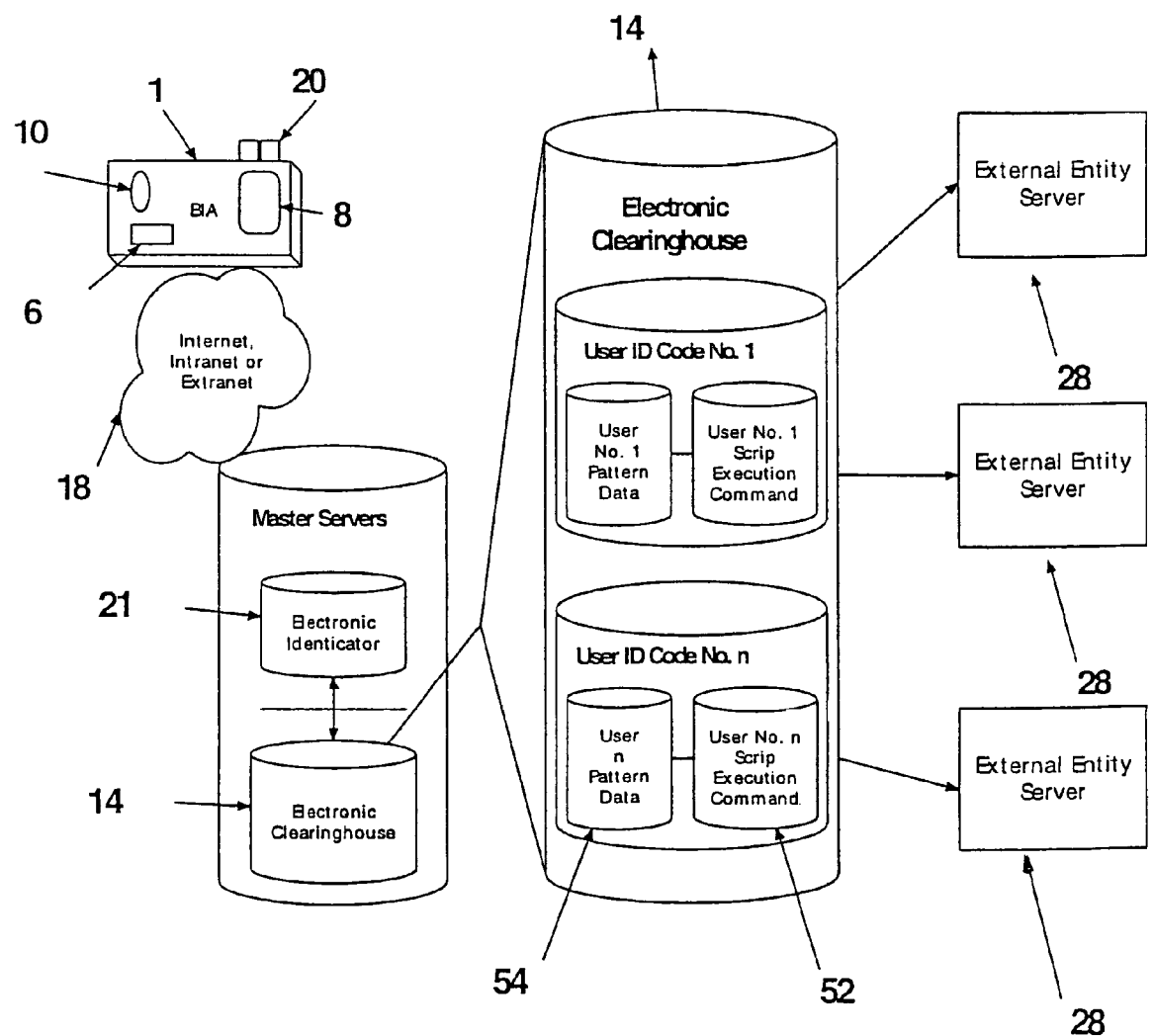
FIG. 3 and FIG. 6 show embodiments of the invention depicting interaction between an Identicator, an electronic clearinghouse governing disbursement of scrip, and an external entity servers.

In FIG. 3, the preferred embodiment is shown in which there is an electronic Registry 15 containing at least one Scrip Donator Account or at least one Scrip Beneficiary Account in the database 51. A scrip account is defined as an account that contains any of the following: a) pre-purchased scrip deposited in a stored value account, or; b) a registered financial account which is designated to donate scrip based upon the Scrip Supporter's purchases. An electronic scrip donator account (Scrip Donator Account) is an account controlled by a Scrip Supporter or a Scrip Merchant (Scrip Merchant), from which scrip is debited as a result of an electronic scrip transaction. An electronic scrip beneficiary account (Scrip Beneficiary Account) is an account controlled by a recipient of scrip donations (Scrip Beneficiary), to which scrip is credited as a result of an electronic scrip transaction.

In one embodiment, there is at least one electronic Master Registry 15 database containing all of the scrip accounts in the computer system and there is at least one electronic Local Registry 19 database containing a sub-set of the scrip accounts in the computer system. In another embodiment, a electronic Local Registry 19 is contained within an external servers 28.

Scrip Account Data

Scrip account data is any information pertaining to a Scrip Donator Account or a Scrip Beneficiary Account (respectively, Scrip Donator Account Data and Scrip Beneficiary Account Data). Such data includes any of the following: a number which uniquely locates or routes a transaction to a scrip account; a number which uniquely identifies a scrip account; instructions or commands pertaining to the processing of a scrip transaction, including which scrip account should be used under which circumstances, the number of units of scrip to be debited from a Scrip Donator Account under which circumstances and the number of units of scrip to be credited to a Scrip Beneficiary Account under which circumstances. Such circumstances may include: Scrip Supporter usage location, Scrip Supporter usage frequency, Scrip Supporter usage recency, Scrip Supporter usage demographics and Scrip Supporter usage volume of electronic scrip transactions.

Execution Module

In a preferred embodiment, an Execution Command 52 of a Rule Module 50 causes an electronic scrip transaction to be executed by the Execution Module 38. The Execution Module 38 may be on a database which is located within the DPC 22 itself, or it may be co-located with an entity database 28 that is external to the DPC. In the event that a designated entity database 28 cannot be contacted for the electronic scrip transaction to be completed, the scrip transaction is "declined".

In one embodiment, if the Scrip Merchant approves the transaction, the Execution Module 38 returns a transaction number to the electronic Registry 15, and the Scrip Supporter's scrip account is thereby adjusted through either a credit or debit. The transaction number is returned to the PDA 1, which lists the transaction on a daily transaction summary. The Scrip Supporter need take no further action since scrip transactions are automatically settled, at which point a calculation is made to automatically adjust the Scrip Supporter's designated scrip account.

In another embodiment, the Execution Module 38 uses Rule Modules 50 from the electronic Clearinghouse 14 which permit a Scrip Merchant to itself contribute scrip directly to a Scrip Beneficiary based upon a Scrip Supporter's purchases.

In such transactions, units of scrip are electronically debited from the Scrip Donator Account controlled by the Scrip Merchant, and corresponding units of scrip are electronically credited to the Scrip Beneficiary Account.

Decryption Module

In a preferred embodiment, all messages the Data Processing Center 22 receives, with the exception of those not transmitted via a PDA 1, contain a PDA hardware identification code, a sequence number, and a Message Authentication Code (MAC). MACs, also known as cryptographic checksums, are well known in the computer industry, and are used to assure that any changes to the content of the message will be detectable by the entity receiving the scrip transaction. The Decryption Module 29 validates the message's MAC and checks the sequence number for that particular PDA. If the Decryption Module 29 determines that both the MAC and the sequence number are valid, the DM 29 uses the unique secret key for that particular PDA 1 to decrypt the message. For the decryption to function properly, the Decryption Module 29 must contain a copy of each PDA's DUKPT key table.

If the decryption operation fails, or if the MAC check fails, the message is considered an invalid message. The Decryption Module 29 logs a warning to the logging facility (LF) 36, terminates processing for the message, and returns an error message to the originating PDA 1.

Before the Decryption Module 29 replies to a message that includes a response key, it encrypts the response message with that response key. The Decryption Module 29 also generates a MAC for the response and appends it to the message.

Preferably, error messages are not encrypted although the Decryption Module 29 does include a MAC for message authentication. Such messages never include confidential information. However, most response messages include a status or response codes that can indicate whether the request succeeded or not. For example, when the Execution Module 38 declines a scrip transaction for a specific reason, it does not return an error message, it returns a normal scrip transaction response message with a response code set to "failed".

Gateway Module (GM)

The Gateway Module 26 serves as an intermediary between redundant Identicator 12 and redundant electronic Registry 15 servers, routing electronic scrip transactions from servers on overload to servers that have available capacity. The Gateway Module 26 also periodically queries servers to ensure that are operative and to alert the system administrator is any server is inoperative.

Firewall (FW)

The firewall 24 provides a first line of defense against network viruses and computer hackers. All communication links into or out of the Identicator 12 and electronic Clearinghouse 14 server sites first pass through a secure firewall 24 Machine.

Preferably, the firewall 24 Machine, an Internet-localnet router, only handles messages destined for the Gateway Module 26 machines.

PDA-equipped terminals send packets to Identicator 12 and electronic Clearinghouse 14 server sites via modem, X.25, or other communication medium. The Identicator 12 and electronic Clearinghouse 14 server sites rely on a entity to supply the modem banks required to handle the volume of calls and feed the data onto the DPC 22 backbone.

For communications between Identicator 12 and electronic Clearinghouse 14 server sites, the FW 24 Machines send out double-length DES encrypted packets. The server site LAN component handles the encryption and decryption: the firewall 24 does not have the ability to decrypt the packets.

A properly configured network sniffer acts as an intruder detector as backup for the FW 24. If an anomalous message is detected, the intruding messages are recorded in their entirety, an operator is alerted, and the firewall 24 is physically shut down by the sniffer.

The firewall 24 disallows any scrip transactions from the internal network to the rest of the Internet. An electronic scrip transaction message requires about 400 bytes and registration packets require about 10 to 20 KB. To handle 1000 electronic scrip transactions per second and 1 registration packet per second, the firewall 24 machines are able to process about 400 KB per second.

Logging Facility

In a preferred embodiment, the logging facility 36 logs all electronic scrip transaction attempts, whether successful or not, to write-once media, so that a record is kept of each scrip transaction and each error that has occurred during the operation of the Identicator 12.

Figure 6:
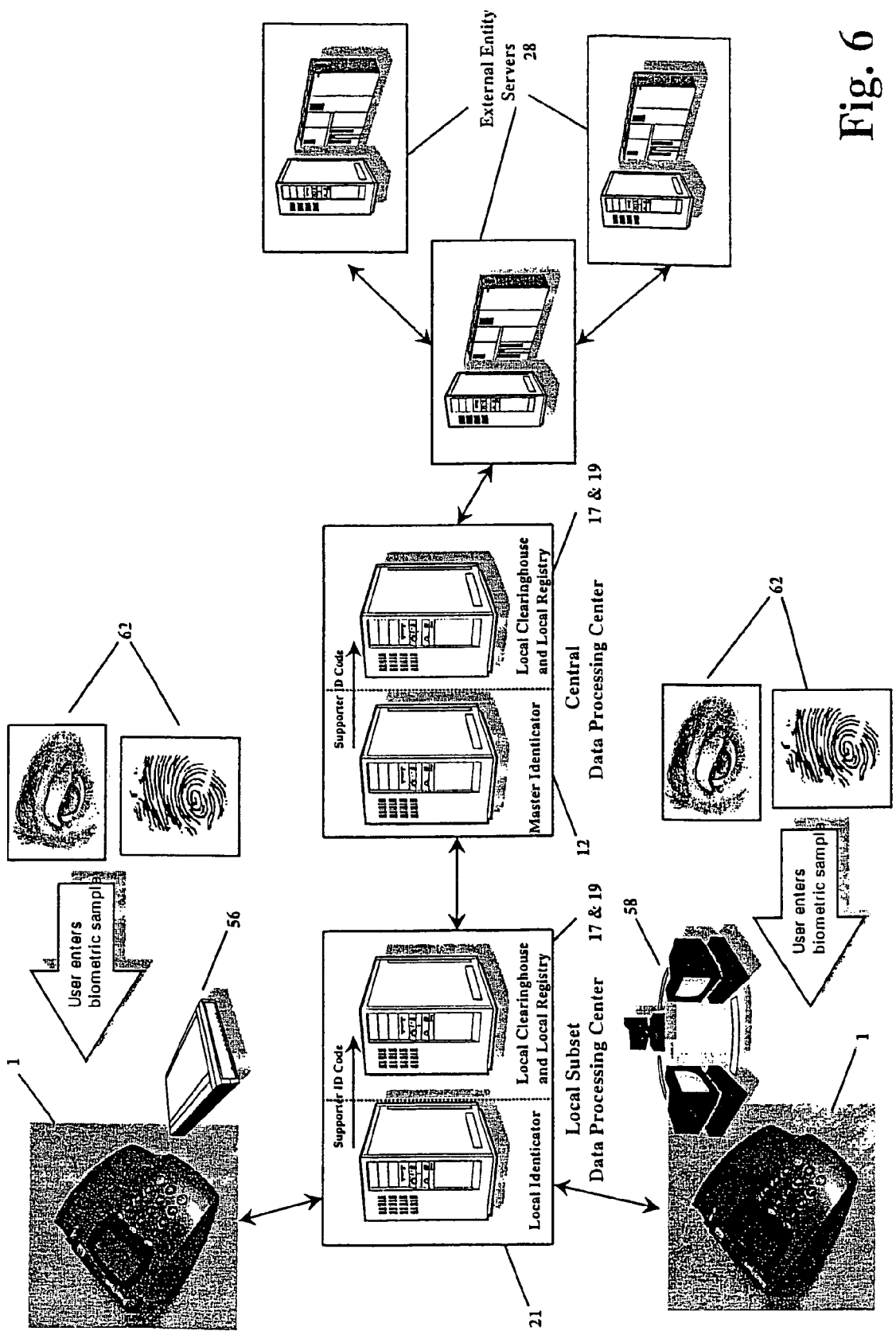

Interconnections and Communications among the Electronic Identicator, Electronic Clearinghouse and Electronic Registry In one embodiment depicted in FIG. 3 and FIG. 6, the Identicator 12 module is physically distinct and separate from the electronic Clearinghouse 14 and the electronic Registry 15 modules with each housed in independent servers or modules. Clearinghouse 14 and Registry 15 are alternatively in separate locations. In another embodiment, the Identicator is physically integrated with the electronic Clearinghouse and the electronic Registry 15, whereby the Identicator 12, electronic Clearinghouse 14 and the electronic Registry 15 are physically interconnected and integrated together within one server or module. In both embodiments, communications among the Identicator 12, the electronic Clearinghouse 14 and the electronic Registry 15 occur via many different methods and means that are well known in the art. Most depend on the particular communication networks already deployed by the organization or company that deploys the electronic scrip transaction authorization system.

In one embodiment the, the Identicator 12, the electronic Clearinghouse 14 and the electronic Registry 15 are connected via Ethernet to a local router, which is connected to a network operations center (NOC) via frame relay lines. Messages are sent among the Identicator 12, the electronic Clearinghouse 14 and the electronic Registry 15 using TCP/IP over this network. In another embodiment, the Identicator 12, the electronic Clearinghouse 14 and the electronic Registry 15 are connected via a cellular digital packet data (CDPD) modem to a CDPD provider, who provides TCP/IP connectivity from the Identicator to an intranet 58 to which at least one electronic Clearinghouse 14 is attached.

In yet another embodiment, an Identicator 12 is connected via the Internet, as is at least one electronic Clearinghouse 14 and at least one electronic Registry 15. TCP/IP is used to transmit messages from among the Identicator 12, the electronic Clearinghouse 14 and the electronic Registry 15. There are many different ways to connect the Identicator, the electronic Clearinghouse 14 and the electronic Registry 15 that are well understood in the industry, such as cable TV networks, cellular telephone networks, telephone networks, the Internet, an intranet, a LAN, a WAN, or an X.25 network.

The Identicator 12 compares a Scrip Supporter's bid biometric sample with previously stored biometric samples from registered Scrip Supporters.

The Identicator 12, the electronic Clearinghouse 14 and the electronic Registry 15 hardware modules are high-reliability database servers, well known in the art, such as those available from Sun™, Compaq™, Tandem™, IBM™ and the like. Further, the Identicator 12, the electronic Clearinghouse 14 and the electronic Registry 15 software may incorporate scalable database architecture, well known in the art, such as those available from Oracle™, Sybase™, Informix™ and the like.

Electronic Identicator, Electronic Clearinghouse and Electronic Registry: Master Servers and Local Servers In certain embodiments, a Master Identicator 12 is responsible for storage of the entire set of biometric samples and digital certificates registered for use with this invention. An electronic Master Clearinghouse 14 is responsible for storage of the entire set of Pattern Data 54, Execution Commands 52, and Rule Modules 50 registered for use with this invention. An electronic Master Registry 15 is responsible for storage of the entire set of Scrip Donator Accounts and Scrip Beneficiary Accounts registered for use with this invention.

Each Master Identicator 12, Master Clearinghouse 14 and Master Registry 15 site is preferably made up of a number of computers and databases connected together over a LAN (known in the industry). Multiple and redundant Master computer sites ensure reliable service in the face of disaster or serious hardware failure at any single central computer site.

In another embodiment, there is at least one Local Identicator 21 server which stores a subset of the entire set of biometric samples and digital certificates registered for use with this invention. In another embodiment, there is at least one Local Clearinghouse 17 server which stores a subset of the entire set of Pattern Data 54, Execution Commands 52, and Rule Modules 50 registered for use with this invention. Such Pattern Data 54 and Execution Commands 52 subsets are circumscribed by any number of criteria including, usage location, usage frequency, usage recency, usage demographics and usage volume of electronic scrip transactions. In another embodiment, there is at least one Local Registry 19 server which stores a subset of the entire set of Scrip Donator Accounts and Scrip Beneficiary Accounts registered for use with this invention.

Preferably, each Master and Local server site has electrical power backup and multiple redundancy in all of its critical hardware and database systems.

It is preferred that the Master servers have a firewall 24 machine which is the entry point of data and messages into these computers, and a gateway machine which is a system coordinator and message processor.

Use-Sensitive Configurations for Identicator, Electronic Clearinghouse and Electronic Registry As shown in FIG. 3 and FIG. 6, in some embodiments the invention has use-sensitive data processing capabilities, wherein at least two Identicators 12, at least two electronic Clearinghouses, or at least two electronic Registries 14 exist, some of which respectively store a subset of the total data registered with the system.

One embodiment comprises at least one Master Identicator 12, one Master Clearinghouse 14 and one Master Registry 15, which respectively contain the entire set of all data registered with the system. This embodiment further comprises at least two Local Identicators 21, at least two Local Clearinghouses 17, or at least two Local Registries 19 that are physically apart from each other. Each Local Identicator 21, Local Clearinghouse 17 and Local Registry 19 contains a subset of the data contained respectively within the Master Identicator 12, Master Clearinghouse 14 and Master Registry 15. Data communications lines allow electronic scrip transactions to flow between each Local Identicator 21, Local Clearinghouse 17 or Local Registry 19, and the Master Identicator 12, Master Clearinghouse 14 or Master Registry 15.

In this embodiment, identification request electronic scrip transactions are first sent to the Local Identicator 21, Local Clearinghouse 17 or Local Registry 19 for processing. If a party cannot be identified by the Local Identicator 21 or if the requisite Rule Module 50 or Scrip Account is not contained, respectively, in the Local Clearinghouse 17 or the Local Registry 19, the electronic scrip transaction is forwarded to the Master Identicator 12, the Master Clearinghouse 14 or the Master Registry 15. If the parties are identified properly by the Master Identicator 12 or if the requisite Rule Module 50 or Scrip Account is located, respectively, in the Master Clearinghouse 14 or the Master Registry 15, the electronic scrip transaction is processed appropriately. In addition, the Scrip Supporter's identity information can be transmitted from the Master Identicator 12 to the Local Identicator 21, so that the next time the Scrip Supporter will be successfully identified by the Local Identicator 21. This can likewise occur for the Master Clearinghouse 14 and Local Clearinghouses 17, and Master Registry 15 and Local Registries 19.

In another embodiment of a use-sensitive system, the system further comprises a purge engine for deleting a party's Scrip Supporter-customized information from the Local Identicator 21, the Local Clearinghouse 17 or the Local Registry 19 databases. In order to store only records for those parties who use the system more than a prescribed frequency and prevent the overload of databases with records from parties who use the system only occasionally, the record of a party is deleted from the Local Identicator 21, Local Clearinghouse 17 or Local Registry 19 databases if there has been no attempt to identify the party upon expiration of a predetermined time limit.

In order to make communications between the Master servers and the Local servers secure, the system further comprises encryption and decryption means, wherein communications between the Master servers and Local servers are encrypted.

External Computers or External Entity Servers

In one embodiment, an Execution Command 52 optionally requires the DPC 22, including the electronic Clearinghouse 14 and the Execution Module 38, to communicate with at least one external entity 28 computer or database to conduct a Scrip Supporter's scrip transaction. For example, the Execution Module 38 may need to communicate with: a banking or credit card institution; a retailer's purchasing incentives database for generating scrip; a scrip beneficiary's computers to determine the correct scrip beneficiary account for scrip disbursal. In this embodiment, at least one Local Clearinghouse 17 or at least one Local Registry 19 is located within an external entity computer.

Retail Point-of-Sale Scrip Transactions

Retail point of sale transactions as shown in FIG. 6 are characterized by identifying the Scrip Supporter using their biometric sample or biometric sample-PIN on a PDA 1 controlled by Scrip Merchant. The Scrip Supporter is thus identified through biometrics, while the Scrip Merchant is identified through the PDA's hardware identification code.

In a preferred embodiment, a Scrip Supporter at the point of sale originates a scrip transaction in the following manner. The Scrip Supporter submits a bid biometric sample obtained from their physical person by the PDA's biometric sensor. The PDA 1 determines that the biometric sample is non-fraudulent, and then translates and compresses that biometric sample into a format suitable for rapid scrip transaction to the DPC 22.

In one embodiment, the Scrip Supporter enters a PIN code into the PDA keypad. The PDA 1 transmits the biometric-PIN to the DPC 22 for identification, along with the PDA hardware identification code. The DPC 22 identifies the Scrip Supporter and the scrip account of the Scrip Supporter using the biometric-PIN sample. The DPC 22 identifies the Scrip Merchant's Donator Account using the PDA hardware identification code that was previously registered by the participating merchant.

The transaction data is entered into the PDA 1, either using an electronic cash register or manually, by the Scrip Supporter. The Scrip Supporter then either approves or cancels the transaction using the PDA's keypad. Once the scrip transaction is approved, the PDA 1 transmits the scrip transaction to the DPC 22. The DPC 22 then forwards the transaction for execution and settlement to the scrip responsible party, which may include any of the following: the DPC 22 itself, a participating merchant, an independent scrip service provider, a financial institution, and the like.

Execution of the transaction may result in a declined transaction due to lack of scrip or other problem condition reported by the Scrip Merchant. If the transaction is declined, the DPC 22 transmits the decline notification back to the PDA 1, canceling the transaction.

Network Scrip Transactions

Network transactions are characterized by identifying the Scrip Supporter using a communications network such as the Internet, an intranet, or an extranet. The Scrip Supporter's bid biometric sample is submitted through the Scrip Supporter's personal PDA 1, or through a public PDA 1 attached to an ATM or other public terminal. Parties identified through a digital certificate are registered network entities, such as either the Scrip Merchant or the Scrip Beneficiary. The Scrip Supporter is identified through biometrics, while the Scrip Merchant or the Scrip Beneficiary, may be identified through the verification of a digital certificate issued by an authorized certifying authority.

In a preferred embodiment, the Scrip Supporter locates the Scrip Merchant by locating the participating merchant's place of business on the network: the web site, using the network address of the Scrip Merchant. The Scrip Supporter downloads the Scrip Merchant's digital certificate to the PDA 1 that the Scrip Supporter is using. The PDA 1 verifies that the digital certificate provided by the Scrip Merchant is a valid certificate.

The Scrip Supporter submits a bid biometric sample obtained from their physical person using the PDA's biometric sensor. The PDA 1 determines that the biometric scan is non-fraudulent, and then translates and compresses that biometric scan into a format suitable for rapid scrip transaction to the DPC 22. In one embodiment, the Scrip Supporter enters a PIN code into the PDA keypad.

The PDA 1 transmits the biometric-PIN to the DPC 22 for identification, along with the Scrip Merchant's digital certificate.

Both parties identify the scrip accounts to be involved in the transaction. The Scrip Supporter does this in an automated manner. In a preferred embodiment, this occurs at the DPC 22 using account selection information included in the transaction by the Scrip Supporter. The Scrip Supporter's scrip account is thereby automatically selected by the DPC 22.

The amount of the transaction is also transmitted to the PDA 1 by the Scrip Merchant. The Scrip Supporter either approves or cancels the transaction using the PDA's keypad. Once the transaction is approved, the PDA 1 transmits the scrip transaction to the DPC 22, where the DPC 22 authorizes the scrip transaction and transmits a new scrip transaction to the appropriate scrip electronic Registry 14. The DPC 22 forwards the transaction for execution and settlement to the scrip responsible party, which may include any of the following: the DPC 22 itself, a participating merchant, an independent scrip service provider, a financial institution, and the like.

Execution by the DPC 22 may result in a declined transaction due to lack of scrip in the account, a closed account, or some other immediately detectable problem condition. If the transaction is declined, the DPC 22 transmits the decline notification back to the PDA 1, and the transaction is cancelled.

In one embodiment, the PDA 1 is actually built-in and/or integrated with a personal computer. These personal computer PDA hardware identification codes are not used to identify either party in a transaction.

In another embodiment, the Scrip Supporter can be a representative of a business entity that has permission to access the business entity's scrip accounts to make direct donations to a scrip beneficiary.

In yet another embodiment, settlement of scrip is delayed for an agreed-upon time period, to enable implementation of net-30 settlement terms and the like.

In one embodiment, the scrip from a network transaction are deposited into an escrow account for an Internet Scrip Merchant or a Scrip Supporter, instead of being directly calculated into the Scrip Supporter's scrip account or donated directly to a Scrip Beneficiary, as a direct settlement for the scrip to be debited or credited.

From the foregoing, it will be appreciated how the objectives and features of the invention are met. First, the invention provides a scrip transaction computer system that eliminates the need for a Scrip Supporter to possess and present any personalized man-made tokens, in order to authorize a transaction.

Second, the invention provides a scrip transaction computer system that is capable of verifying a Scrip Supporter's unique personal identity, as opposed to verifying possession of personalized objects and information.

Third, the invention verifies the Scrip Supporter's identity based upon one or more unique characteristics physically personal to the Scrip Supporter.

Fourth, the invention provides a cost-effective scrip transaction system that is practical, convenient, and easy use.

Fifth, the invention provides a system of secured access to a scrip computer system that is highly resistant to fraudulent transaction authorization attempts by unauthorized Scrip Supporters.

Sixth, the invention provides a scrip transaction authorization system that enables a Scrip Supporter to notify authorities that a particular access request is being coerced by a third party without giving notice to the third party of the notification.

Although the invention has been described with respect to a particular Identicator and method for its use, it will be appreciated that various modifications of the apparatus and method are possible without departing from the invention, which is defined by the claims set forth below.

What is claimed is:

1. A tokenless electronic scrip transaction authorization device, said device comprising:
    at least one electronic scrip supporter registration biometric sample received from a scrip supporter;

an electronic identicator for comparing a bid biometric sample from said scrip supporter with the at least one scrip supporter registration biometric sample to produce a successful or failed identification result;

an electronic scrip donator account to be debited as a result of a scrip transaction conducted by said scrip supporter with a merchant;

an electronic scrip beneficiary account to be credited as a result of said scrip transaction, said electronic scrip beneficiary account owned by an electronic scrip beneficiary different from both said scrip supporter and said merchant, said electronic scrip beneficiary being a charitable or non-profit organization; and an electronic clearinghouse that contains at least one rule module, said at least one rule module including at least one pattern data that is associated with at least one execution command, said execution command including instructions for accessing at least one electronic registry that contains any one of the following: at least one electronic scrip donator account and at least one electronic scrip beneficiary account;

wherein upon successful identification of said scrip supporter, said scrip transaction is authorized and a value is debited from said electronic scrip donator account and credited to said electronic scrip beneficiary account without said scrip supporter presenting any smartcards or magnetic swipe cards.

2. The device of claim 1 further comprising at least one local identicator containing a subset of the registration biometric samples in the identicator.

3. The device of claim 1, wherein pattern data is selected from a group consisting of the following: a unique scrip supporter identification code, demographic information, an email address, at least one pre-determined formula for scrip donations, secondary biometric, a telephone number, a mailing address, purchasing patterns, a digital certificate, a network credential, an Internet protocol address, a digital signature, and an encryption key.

4. The device of claim 1, wherein the electronic registry is located on a computer that is external to the authorization device.

5. The device of claim 1, further comprising at least one local clearinghouse containing a subset of all of the rule modules in the scrip transaction system.

6. The device of claim 1 further comprising a merchant registered identification data for comparing a merchant bid identification data with merchant registered identification data for producing either a successful or failed identification of the merchant.

7. The device of claim 6 wherein the merchant identification data is selected from a group consisting of the following: a hardware identification code, a telephone number, an email address, a digital certificate code, an account index, an electronic account number, a biometric, or a biometric and personal identification number combination.

8. The device of claim 1 further comprising at least one beneficiary identification data for comparing a scrip beneficiary bid identification data with a scrip beneficiary registered identification data for producing either a successful or failed identification of the scrip beneficiary.

9. The device of claim 8 wherein the beneficiary identification data is selected from a group consisting of the following: a hardware identification code, a telephone number, an email address, a digital certificate code, an account index, an electronic account number, a biometric, or a biometric and personal identification number combination.

10. The device of claim 1 further comprising a supporter personal identification number for identifying the supporter.

11. The device of claim 1 wherein said scrip is selected from a group consisting of any unit of the following: gift certificates, stored-value units, electronic or paper coupons having a pre-determined dollar value, minutes of telephone calling time, miles towards earning a free airplane flight, points towards receiving a commodity or service.

12. The device of claim 1 wherein the electronic scrip donator account is selected from a group consisting of the following: a stored value account and a financial account.

13. The device of claim 1 wherein the electronic beneficiary account is selected from a group consisting of the following: a stored value account and a financial account.

14. The device of claim 6 wherein said scrip transaction is authorized and a value is debited from said electronic scrip donator account and credited to said electronic scrip beneficiary account upon successful identification of said scrip supporter and successful identification of said merchant.

15. The device of claim 1, wherein the electronic identicator is operative to compare said bid biometric sample from said scrip supporter with the at least one scrip supporter registration biometric sample and at least one registration biometric sample from a second scrip supporter to produce a successful or failed identification result.

* * * * *

UNITED STATES PATENT AND TRADEMARK OFFICE
CERTIFICATE OF CORRECTION

PATENT NO. : 7,698,567 B2  Page 1 of 1
APPLICATION NO. : 11/321114
DATED : April 13, 2010
INVENTOR(S) : Ned Hoffman It is certified that error appears in the above-identified patent and that said Letters Patent is hereby corrected as shown below:

References Cited

U.S. PATENT DOCUMENTS:

Page 2, column 2, line 55:

Change "5,613,102 A 3/1997 Chiang et al." to --5,613,012 A 3/997 Hoffman, et al.--

FOREIGN PATENT DOCUMENTS:

Page 3, column 2, insert:

--JP  11039540   2/1999
 JP   11154260   6/1999
 JP   11003382   1/1999
 WO  WO98/23062  5/1998--

Signed and Sealed this

Fourteenth Day of September, 2010

David J. Kappos
*Director of the United States Patent and Trademark Office*